United States Patent
Shi et al.

(10) Patent No.: US 7,599,931 B2
(45) Date of Patent: Oct. 6, 2009

(54) WEB FORUM CRAWLER

(75) Inventors: Bin Shi, Beijing (CN); Gu Xu, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 237 days.

(21) Appl. No.: 11/368,261

(22) Filed: Mar. 3, 2006

(65) Prior Publication Data

US 2007/0208703 A1   Sep. 6, 2007

(51) Int. Cl.
*G06F 7/00* (2006.01)
*G06F 17/30* (2006.01)

(52) U.S. Cl. ............................................. 707/6; 707/4
(58) Field of Classification Search ............ 707/4, 707/6
See application file for complete search history.

(56) References Cited

U.S. PATENT DOCUMENTS

| | | | | |
|---|---|---|---|---|
| 6,304,864 | B1 * | 10/2001 | Liddy et al. | 706/15 |
| 6,377,984 | B1 * | 4/2002 | Najork et al. | 709/217 |
| 6,418,433 | B1 * | 7/2002 | Chakrabarti et al. | 707/5 |
| 6,418,452 | B1 * | 7/2002 | Kraft et al. | 707/200 |
| 6,418,453 | B1 * | 7/2002 | Kraft et al. | 707/200 |
| 6,547,829 | B1 * | 4/2003 | Meyerzon et al. | 715/234 |
| 6,631,369 | B1 * | 10/2003 | Meyerzon et al. | 707/4 |
| 6,941,300 | B2 * | 9/2005 | Jensen-Grey | 707/4 |
| 7,003,528 | B2 * | 2/2006 | Dan et al. | 707/102 |
| 7,093,012 | B2 * | 8/2006 | Olstad et al. | 709/224 |
| 7,139,747 | B1 * | 11/2006 | Najork | 707/3 |
| 7,299,219 | B2 * | 11/2007 | Green et al. | 707/2 |
| 7,305,610 | B1 * | 12/2007 | Dean et al. | 715/205 |
| 7,308,643 | B1 * | 12/2007 | Zhu et al. | 715/733 |
| 7,310,632 | B2 * | 12/2007 | Meek et al. | 707/3 |
| 7,310,658 | B2 * | 12/2007 | Giles et al. | 709/206 |
| 7,383,299 | B1 * | 6/2008 | Hailpern et al. | 709/203 |
| 2002/0087573 | A1 * | 7/2002 | Reuning et al. | 707/102 |
| 2004/0225642 | A1 * | 11/2004 | Squillante et al. | 707/3 |
| 2005/0086206 | A1 * | 4/2005 | Balasubramanian et al. | 707/3 |

OTHER PUBLICATIONS

Aggarwal, Charu, Fatima Al-Garawl and Philip S. Yu, "Intelligent Crawling on the World Wide Web with Arbitrary Predicates," WWW10, Hong Kong, May 2001, pp. 96-105.

Bergmark, Donna, Carl Lagoze and Alex Sbityakov, "Focused Crawls, Tunneling, and Digital Libraries," Proceedings of the 6th European Conference on Digital Libraries, Sep. 2002, 16 pages.

(Continued)

*Primary Examiner*—James Trujillo
*Assistant Examiner*—Jorge A Casanova
(74) *Attorney, Agent, or Firm*—Perkins Coie LLP

(57) ABSTRACT

A crawling system crawls a web site initially in a pattern detection phase and subsequently in a pattern usage phase. The pattern detection phase attempts to identify patterns of references to pages that contain informational content of interest and patterns of references to pages that contain little informational content of interest. During the pattern usage phase, the crawling system crawls the web site. When the crawling system encounters a reference contained on an accessed page, the crawling system determines whether the reference matches a reference pattern. If the reference matches a reference pattern associated with pages that contain informational content of interest, the crawling system accesses the referenced page. If, however, the reference matches a reference pattern of pages with little informational content, then the crawling system discards that reference without accessing the referenced page.

14 Claims, 22 Drawing Sheets

OTHER PUBLICATIONS

Brin, Sergey and Lawrence Page, "The Anatomy of a Large-Scale Hypertextual Web Search Engine," Proceedings of the 7th International World Wide Web Conference, Apr. 1998, http://www7.scu.edu.au/programme/fullpapers/1921/com1921.htm, pp. 1-26.

Broder, Andrei Z., "On the resemblance and containment of documents," Proceedings of the Compression and Complexity of Sequences, Washington, DC, 1997, pp. 1-9.

Broder, Andrei Z., "Some applications of Rabin's fingerprinting method," Sequences II: Methods in Communications, Security, and Computer Science, Springer-Verlag, 1993, pp. 1-10.

Burner, Mike, "Crawling towards Eternity—Building An Archive of The World Wide Web," New Architect, CMP Media, Archives May 1997, 7 pages.

Chakrabarti, Soumen et al., "The Structure of Broad Topics on the Web," WWW2002, Honolulu, Hawaii, 13 pages.

Chakrabarti, Soumen, Kunal Punera and Mallela Subramanyam, "Accelerated Focused Crawling through Online Relevance Feedback," WWW2002, Honolulu, Hawaii, 12 pages.

Chakrabarti, Soumen, Martin van den Berg and Byron Dom, "Focused crawling: a new approach to topic-specific Web resource discovery," 8th International World Wide Web Conference, 1999, Toronto, Canada, © 1999 Published by Elsevier Science B.V., pp. 545-562.

Cho, Junghoo, Hector Garcia-Molina and Lawrence Page, "Efficient Crawling Through URL Ordering," 7th International World Wide Web Conference, May 1998, 20 pages.

De Bra, Dr. P.M.E and Dr. R.D.J. Post, "Information Retrieval in the World-Wide Web: Making Client-based searching feasible," 1st International World Wide Web Conference, May 1994, 10 pages.

Diligenti, M. et al., "Focused Crawling Using Context Graphs," Proceedings of the 26th VLDB Conference, Cairo, Egypt, 2000, 8 pages.

Edwards, Jenny, Kevin McCurley and John Tomlin, "An Adaptive Model for Optimizing Performance of an Incremental Web Crawler," WWW10, May 2001, Hong Kong, 16 pages.

Google search engine, http://www.google.com [last accessed May 23, 2006].

Hersovici, Michael et al., "The shark-search algorithm—An application: tailored Web site mapping," Proceedings of the 7th International World Wide Web Conference, Apr. 1998, 10 pages.

Heydon, Allan and Marc Najork, "Mercator: A Scalable, Extensible Web Crawler," Jun. 26, 1999, http://www.research.compaq.com/SRC/mercator/papers/www/paper.html, 14 pages.

Johnson, Judy, Kostas Tsioutsiouliklis and C. Lee Giles, "Evolving Strategies for Focused Web Crawling," Proceedings of the 20th International Conference on Machine Learning, Washington, DC, 2003, 8 pages.

Liu, Hongyu, Evangelos Milios and Jeannette Janssen, "Probabilistic Models for Focused Web Crawling," WIDM'04, Nov. 2004, Washington, DC, © 2004 ACM, pp. 16-22.

Raghavan, Sriram and Hector Garcia-Molina, "Crawling the Hidden Web," 2001, Proceedings of the 27th International Conference on Very Large Databases, pp. 1-25.

Rennie, Jason and Andrew Kachites McCallum, "Using Reinforcement Learning to Spider the Web Efficiently," Proceedings of the 16th International Conference on Machine Learning, Bled, Slovenia, 1999, 10 pages.

Yih, Wen-tau, Po-hao Chang and Wooyoung Kim, "Mining Online Deal Forums for Hot Deals," 2004, IEEE/WIC/ACM International Conference on Web Intelligence, 7 pages.

\* cited by examiner

WEB FORUM CRAWLER

BACKGROUND

A web forum is a web site that typically allows users of the web site to post information that is available to be viewed by other users of the web site. Web forums provide a vast amount of information on a wide range of topics. Many web forums are dedicated to a specific topic. Such a web forum may have many different discussion threads relating to the topic. A user of such a web forum can select a discussion thread and then participate in the discussion. Other web forums may have discussion threads relating to many topics that may be hierarchically organized. To participate in a discussion, a user of such a web forum first selects a topic and then selects the discussion thread of interest. A discussion thread is typically initiated when a person creates an initial message directed to a topic and posts the message as a new discussion thread. Other persons can read the initial message and post response (or reply) messages to the discussion thread. For example, the initial message may pose a question such as "Has anyone encountered a situation where the Acme software product aborts with error number 456?" Persons who want to participate in the discussion can post response messages such as "It happens to me all the time" or "I fixed the problem by reinstalling the software." Discussion threads typically take the form of a tree structure as sequences of messages branch off into different paths. For example, three different persons can post a response message to the initial message, starting three branches, and other persons can post response messages to any one of those response messages to extend those branches.

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of base web pages to identify all web pages that are accessible through those base web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how related the information of the web page may be to the search request. The search engine service then displays to the user links to those web pages in an order that is based on their relevance.

Search engine services, however, do not perform well when a crawling a web forum, for various reasons. One reason is that a typical web forum has many pages with very little informational content that is of interest to a user who is searching on a specific topic. For example, each posting page may have a link to a reply page without a quotation and a link to a reply page with a quotation. These reply pages, however, contain no additional informational content that would be of interest to a user that is not already on the posting page. Another reason is that many web forums prohibit unregistered users from accessing user profiles. As a result, if a crawler does not use cookies, all accesses to profile pages will actually access a login page, which has no informational content of interest. Because of these and other reasons, current search engine services perform slowly when crawling a web forum and spend a considerable amount of time accessing web pages with no informational content of interest.

SUMMARY

A method and system for crawling a web site having web pages is provided. The crawling system crawls a web site initially in a pattern detection phase and subsequently in a pattern usage phase. The pattern detection phase attempts to identify patterns of references to pages that contain informational content of interest and patterns of references to pages that contain little informational content of interest. The crawling system may distinguish various types of pages as informational pages, navigational pages, operational pages, and so on. During the pattern detection phase, the crawling system may crawl the web site to determine the types of pages of the web site and then attempt to identify patterns of the references for each type page. The output of the pattern detection phase includes reference patterns indicating that pages referenced by matching references should be accessed during the pattern usage phase because the pages likely contain information of interest ("follow reference patterns"). The output also includes reference patterns indicating that pages referenced by matching references should not be accessed during the pattern usage phase because the pages likely contain little information of interest ("do not follow reference patterns"). During the pattern usage phase, the crawling system crawls the web site. When the crawling system encounters a reference contained on an accessed page, the crawling system determines whether the reference matches a reference pattern. If the reference matches a follow reference pattern, the crawling system accesses the referenced page. If, however, the reference matches a do not follow reference pattern, then the crawling system discards that reference without accessing the referenced page.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
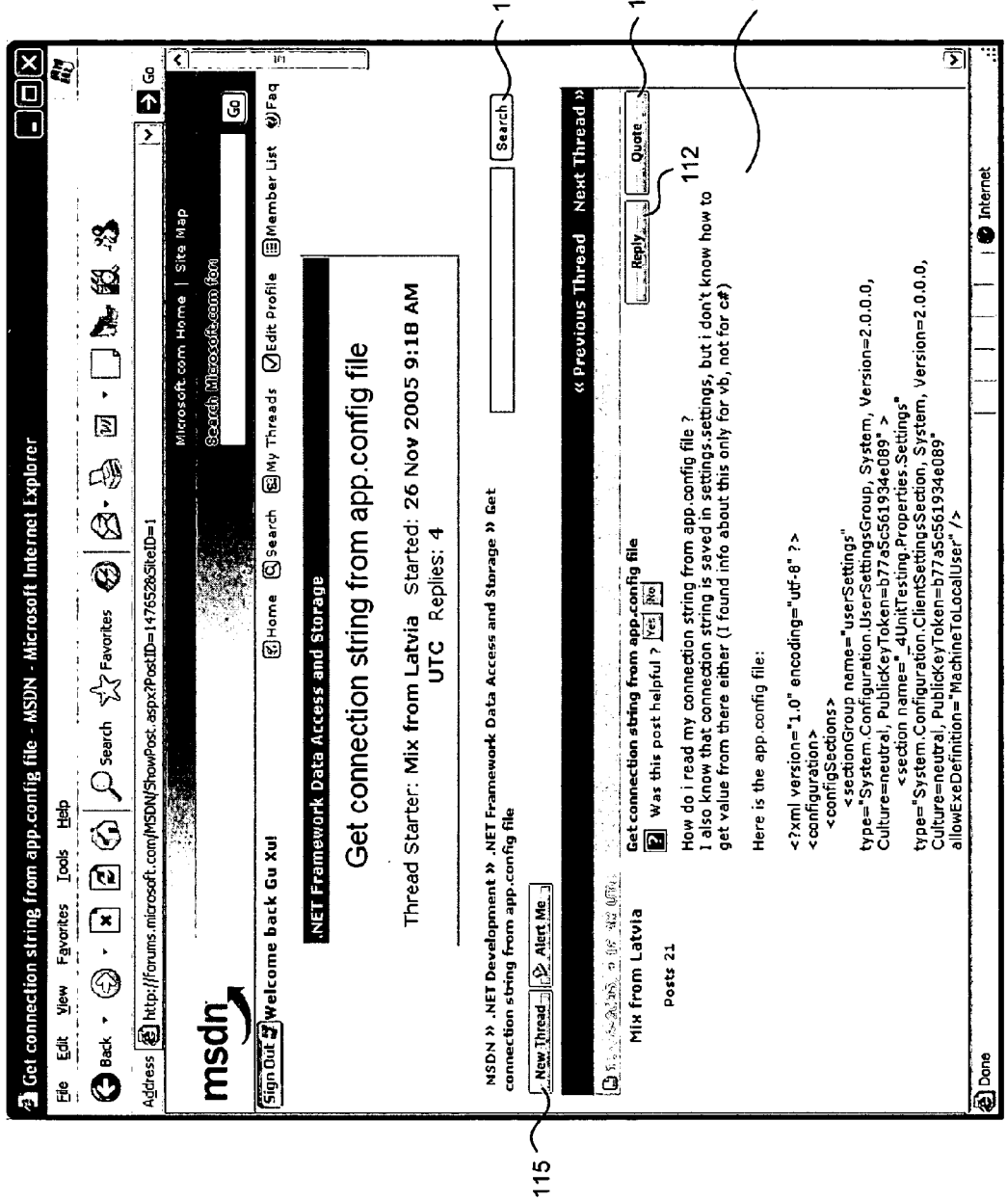
FIGS. 1A-1C illustrate the types of pages of a web forum.

A method and system for crawling a web site having web pages is provided. In one embodiment, the crawling system crawls a web site initially in a pattern detection phase and subsequently in a pattern usage phase. The pattern detection phase attempts to identify patterns of references (e.g., uniform resource locators) to pages (e.g., web pages) that contain informational content of interest and patterns of references to pages that contain little informational content of interest. The crawling system may distinguish various types of pages as informational pages, navigational pages, operational pages, and so on. Informational pages contain the primary informational content of a web site such as pages that contains thread postings and pages that contain user profiles. Navigational pages provide a mechanism for navigating through the web site such as pages that contain a hierarchy of topics and pages that contain listings of threads within a topic. Navigational pages contain some informational content that may be of interest to a user. In addition, navigational pages are typically on the path from the root page of a web site to the informational pages. Web crawlers thus use navigational pages to locate informational pages. Operational pages provide the overall functioning of the web site such as pages for logging in and pages for replying to a posting. Operational pages contain very little, if any, informational content that may be of interest to a user. During the pattern detection phase, the crawling system may crawl the web site to determine the types of pages of the web site and then attempt to identify patterns of the references for each type of page. For example, the crawling system may determine that many references to operational pages may have the pattern "*?reply.asp" meaning that the references end with the string "?reply.asp." The crawling system may also determine that many references to informational pages may have the pattern "*user-id=*" meaning that the references contain the string "user-id=." The output of the pattern detection phase includes reference patterns indicating that pages referenced by matching references should be accessed during the pattern usage phase because the pages likely contain information of interest ("follow reference patterns"). The output also includes reference patterns indicating that pages referenced by matching references should not be accessed during the pattern usage phase because the pages likely contain little information of interest ("do not follow reference patterns"). During the pattern usage phase, the crawling system crawls the web site starting at the main page of the web site or a collection of entry point pages of the web site. When the crawling system encounters a reference contained on an accessed page, the crawling system determines whether the reference matches a reference pattern. If the reference matches a follow reference pattern, the crawling system accesses the referenced page. If, however, the reference matches a do not follow reference pattern, then the crawling system discards that reference without accessing the referenced page. Thus, the crawling system by initially performing a pattern detection phase can learn the reference patterns of a web site and use the reference patterns during subsequent crawling of the web site to reduce the chances of accessing a page that has little informational content of interest to a user.

In one embodiment, the crawling system performs the pattern detection phase on a web forum by web forum basis. Since the different web forums are directed to different topics and use different languages, styles, appearances, serving systems, overall organization, and so on, the reference patterns detected for one web forum may not be appropriate for another web forum.

In one embodiment, the crawling system during the pattern detection phase for a web forum identifies groups or clusters of pages that contain similar content. When the crawling system accesses a page, it determines whether that page is similar to any cluster of pages previously accessed. If so, the crawling system adds that page to the cluster. If the page is not similar to any cluster, then the crawling system generates a new cluster that contains that page. If a cluster contains more than an operational threshold number of pages, then the crawling system assumes that the cluster contains operational pages. Because operational pages are very similar and are encountered very often when crawling a web forum, a cluster with many pages likely represents a cluster of operational pages. In contrast, if a cluster contains less than an informational threshold number of pages, then the crawling system assumes that the cluster contains informational pages. Because informational pages are typically very different from each other, a cluster with few pages likely represents a cluster of informational pages. In one embodiment, the crawling system during the pattern detection phase identifies reference patterns for clusters of pages. A reference pattern represents a pattern of the references of the pages of a cluster. The reference patterns identified for clusters of informational pages are follow reference patterns, and reference patterns identified for clusters of operational pages are do not follow reference patterns.

In one embodiment, the crawling system identifies and filters outs the effects of multiple reference pages. A multiple reference page is a page that is referenced by different references. For example, a posting page may be referenced with one reference from a thread listing page, another reference from the previous posting page, and yet another reference from the next posting page. So, each posting page may have three different references. The following is an example of three references that reference posting page 0002:

"http://forumhost/viewthread.asp?id=0002"
"http://forumhost/viewthread.asp?id=0001?nav=next"
"http://forumhost/viewthread.asp?id=0003?nav=prev"

The first reference may be contained on a listing page, the second reference may be contained on the previous posting page, and the third reference may be contained on the next posting page. The crawling system filters out the effects of multiple reference pages by designating a reference pattern of one of the references as follow and designating the reference patterns for the other references as do not follow. In this way, the crawling system during the pattern usage phase will correctly access pages with references that match the follow reference pattern and not access pages with references that match the do not follow reference pattern and thus avoid unnecessary accesses.

In one embodiment, the crawling system identifies similarity between pages using a similarity measurement referred to as "resemblance." Resemblance uses "shingles," rather than words, as the basic unit of a page. A w-shingle is a contiguous sequence with w words. For performance considerations, the crawling system may use only a small fraction of the shingles, referred to as a "sketch," when determining similarity. For example, the crawling system may perform its similarity calculation using every $10^{th}$ shingle. The crawling system calculates a hash, referred to as a "fingerprint," for each shingle and uses the hashes for the shingles when determining similarity. The crawling system may determine similarity according to the following equation:

$$r_w(D_A, D_B) = \frac{|S_A \cap S_B|}{|S_A \cup S_B|} \quad (1)$$

where $r_w$ represents the resemblance, $D_A$ and $D_B$ represent pages, and $S_A$ and $S_B$ represent the shingles of the pages. The resemblance is thus a value between 0 and 1. If pages are small in size, however, the resemblance of Equation 1 will be very sensitive to any change in the page. To make the resemblance calculation less sensitive for small pages, the crawling system factors in the size of the page when determining resemblance. The crawling system may determine resemblance according to the following equation:

$$r_w(D_A, D_B) > \frac{e^x + \alpha e^{-x}}{e^x + e^{-x}} \quad (2)$$
$$x = \frac{\beta}{T}(|S_A \cup S_B| - |S_A \cap S_B| - T)$$

where $\alpha$ represents a relative threshold for small pages, T represents an absolute threshold for large pages, and $\beta$ represents a control for the transition between small and large pages. When the number of different shingles is less than T, Equation 2 works like a relative criterion with a fixed threshold. When the number of shingles is greater than T, Equation 2 quickly boosts the threshold to be close to 1.

In one embodiment, the crawling system uses a fast Rabin fingerprint calculation to generate the hashes for the shingles of a page. The polynomial A is represented by the following equation:

$$A(t)=a_1 t^{m-1}+a_2 t^{m-2}+\ldots+a_m \quad (3)$$

where A(t) represents a polynomial of degree m−1 with coefficients in $Z_2$ and $A=A=(a_1, a_2, \ldots, a_m)$ is a binary string where $a_1$ is 1. $Z_2$ represents a mathematical group over the operation XOR. The crawling system represents the fingerprint calculation by the following equation:

$$f(A)=A(t) \bmod p(t) \quad (4)$$

where p(t) is an irreducible polynomial of degree k over $Z_2$. Since the crawling system operates on text that is typically stored as one-byte characters, the crawling system represents the fingerprint calculation by the following equation:

$$f(B) = f(b_1 t^{8(n-1)} + b_2 t^{8(n-2)} + \cdots + b_n) \quad (5)$$
$$= f(b_1 t^{8(n-1)}) + f(b_2 t^{8(n-2)}) + \cdots f(b_n)$$

where $B=(b_1, b_2, \ldots, b_n)$ is a text string. Because adjacent shingles share all but the first word of the first shingle and the last word of the second shingle, the crawling system uses a "sliding window" when calculating the fingerprints. The sliding window is represented by the following equation:

$$f(S_k) = f(s_k t^{Sl_{k,1}} + s_{k+1} t^{Sl_{k,2}} + \cdots + s_{k+w-1}) \quad (6)$$
$$= f(f(s_k) t^{Sl_{k,1}}) + \cdots + f(s_{k+w-1})$$

where $S_k=(s_k, s_{k+1}, \ldots s_{k+w-1})$ represents a w-shingle of page D, $s_i$ represents the ith word of D, $l_i$ represents the byte length of word $s_i$, and $Sl_{k,i}$ represents the accumulated bit length as represented by the following equation:

$$Sl_{k,i} = \sum_{p=i}^{w-1} 8l_{k+p} \quad (1 \le i \le w-1) \quad (7)$$

Once one fingerprint is calculated, the crawling system can calculate the fingerprint for the next shingle as represented by the following equation:

$$f(S_{k+1})=f((f(S_k)-f(f(s_k)t^{Sl_{k,1}}))t^{8l_{k+w}})+f(s_{k+w}) \quad (8)$$

The crawling system may represent the fingerprint F with four bytes represented as $(f_1, f_2, f_3, f_4)$. Thus, the fingerprint calculation can be represented by the following equation:

$$f(Ft^x)=f(f_1 t^{x+24})+f(f_2 t^{x+16})+f(f_3 t^{x+8})+f(f_4 t^x) \quad (9)$$

The crawling system uses lookup tables to simplify the fingerprint calculations. The crawling system pre-computes tables for the range 0 to 255. If the maximum byte length of a shingle is q, then the crawling system stores four tables of 256 bytes for each length of shingle (i.e., 4*256*q).

In one embodiment, the crawling system during the pattern detection phase dynamically generates clusters of pages as it crawls a web forum. When a page is accessed, the crawling system pre-processes the page by removing all HTML tags from the page, leaving the text. The crawling system then calculates the fingerprint sketch as described above. The crawling system then compares the fingerprint sketch to each cluster using Equation 2. If the fingerprint sketch resembles a representative sketch of a cluster, then the crawling system adds the page to that cluster. Otherwise, the crawling system creates a new cluster that contains the page. The representative sketch of a cluster may be the fingerprint sketch of the first page added to the cluster or may be a combination of the fingerprints of the pages of the cluster. Because web forums can contain a very large number of pages, the crawling system may limit the number of clusters that can be created. If the number of clusters would exceed that limit, then the crawling system may remove clusters that contain no more than a certain number of pages and add those pages to an "overflow bucket." Such removed clusters may be considered to be clusters of informational pages. Also, if the size of a cluster exceeds a threshold, then the crawling system generates reference patterns for the cluster and removes pages from the cluster that match a reference pattern. If the size of the cluster cannot be reduced below the threshold, then the crawling system may discard the cluster.

In one embodiment, the crawling system discovers the patterns of references by analyzing a tokenized representation of the references within a cluster. A reference pattern uses wildcards to identify sequences of characters of a reference that match the reference pattern. For example, the following are reference patterns for uniform resource locators ("URLs"):

http://forumhost/newreply.asp?postid*
http://forumhost/newreply*,quote

The following URL match the first pattern:

http://forumhost/newreply.asp?postid=0135 and the following URL match the second pattern:

http://forumhost/newreply.asp?id=1234,quote

The crawling system may use various techniques for identifying tokens within a reference. For example, when the reference is a URL, the crawling system may first divide the characters of the URL into fragments divided by the non-alphanumeric characters (e.g., ":", "-", "/"). The crawling system then merges a fragment with an initial hyphen, underline, or plus character followed by alphabetic (or alphanumeric) characters with the previous fragment when the previous fragment ends with alphabetic (or alphanumeric) characters. The crawling system then splits the fragments where they transition from alphabetic to numeric characters or from numeric to alphabetic characters. The resulting fragments are the tokens of the URL. The crawling system may hash the tokens and use the hash values when discovering reference patterns.

In one embodiment, the crawling system attempts to identify reference patterns of a cluster that satisfy the following criteria. First, a reference pattern should match at least m of the n pages of the cluster. Second, a reference pattern should contain at least one wildcard character (e.g., "*"). Third, a reference pattern should not have two adjacent wildcard characters. Fourth, the entropy of each wildcard character of a reference pattern should be larger than a threshold. The entropy is a measure of the reliability of a wildcard character. The crawling system may represent the entropy of a wildcard character by the following equation:

$$H(S) = \begin{cases} -\frac{1}{\log k} \sum_{i=1}^{k} \left(\frac{n_i}{n}\right) \log\left(\frac{n_i}{n}\right) & (k > 2) \\ 0 & \text{otherwise} \end{cases} \quad (10)$$

where H represents a the entropy, S represents the set of k tokens which are replaced by the wildcard in the reference pattern, and $n_i$ represents a token in S.

In one embodiment, the crawling system identifies reference patterns for the references of a cluster using a prune-and-search technique. The crawling system first divides the references of the cluster into subsets based on the token length of the references and processes each subset separately. The crawling system processes the references within the subset based on the value of a currently indexed token. The crawling system adds the token to the reference pattern for that subset. The crawling system then attempts to identify reference patterns for the subset starting at the next following token and removes any matching references from the parent subset. The crawling system then adds the wildcard character to the reference pattern to generate a reference pattern for those references in subsets that are less than a certain size. If the pattern does not violate the third or fourth criterion, the crawling system attempts to identify a reference pattern starting at the next token for those subsets less than a certain size. As described above, the crawling system designates reference patterns discovered from clusters that have more than a threshold number of pages as operational. The crawling system adds references of clusters with not more than the threshold number of pages to an overflow bucket. When the overflow is full, the crawling system discovers reference patterns for the pages in the overflow bucket and designates them as informational.

In one embodiment, the crawling system maintains a reference pattern database for checking references for the pages of the clusters. The crawling system represents the reference patterns using a prefix-tree structure. Each node of the tree represents a token of a reference pattern. The crawling system avoids adding patterns that identify references to the same set of pages to the database. In addition, the crawling system does not add reference patterns whose matching references are a subset of other reference patterns. The crawling system may use a prefix tree data structure to represent the reference patterns.

In one embodiment, the crawling system attempts to identify higher-level reference patterns from the reference patterns of the database. The crawling system represents a suffix signature for a reference pattern by the following equation:

$$S(N) = \begin{cases} \sum_{i=1}^{m} f((H(c_{k_i}) + S(c_{k_i}))t^{32(i-1)}) & m > 0 \\ 0 & m = 0 \end{cases} \quad (11)$$

where S represents the suffix signature on node N, H(N) represents the hash value of node N, $C_N = (c_1, c_2, \ldots, c_m)$ are child nodes of N, and f(.) represents Equation 5. If two node suffix signatures are equal, then the crawling system assumes that the subtrees rooted at the two nodes are identical except for the two nodes. If a number of sibling nodes have the same hash value, then the crawling system removes all but one subtree and replaces the token of the remaining subtree with a wildcard.

In one embodiment, the crawling system determines whether a page is referenced by more than one reference based on reference patterns. The crawling system considers that a reference pattern is a duplicate of another reference pattern based on overlap of pages referenced by the reference patterns. The crawling system determines the number of overlapping pages based on the resemblance between pairs of pages. When the number exceeds a threshold, the crawling system considers the reference patterns to be duplicates. Whenever the crawling system designates to follow the reference pattern, the crawling system determines whether the reference pattern is a duplicate. If so, the crawling system re-designates the reference pattern to not follow.

Figure 1B:
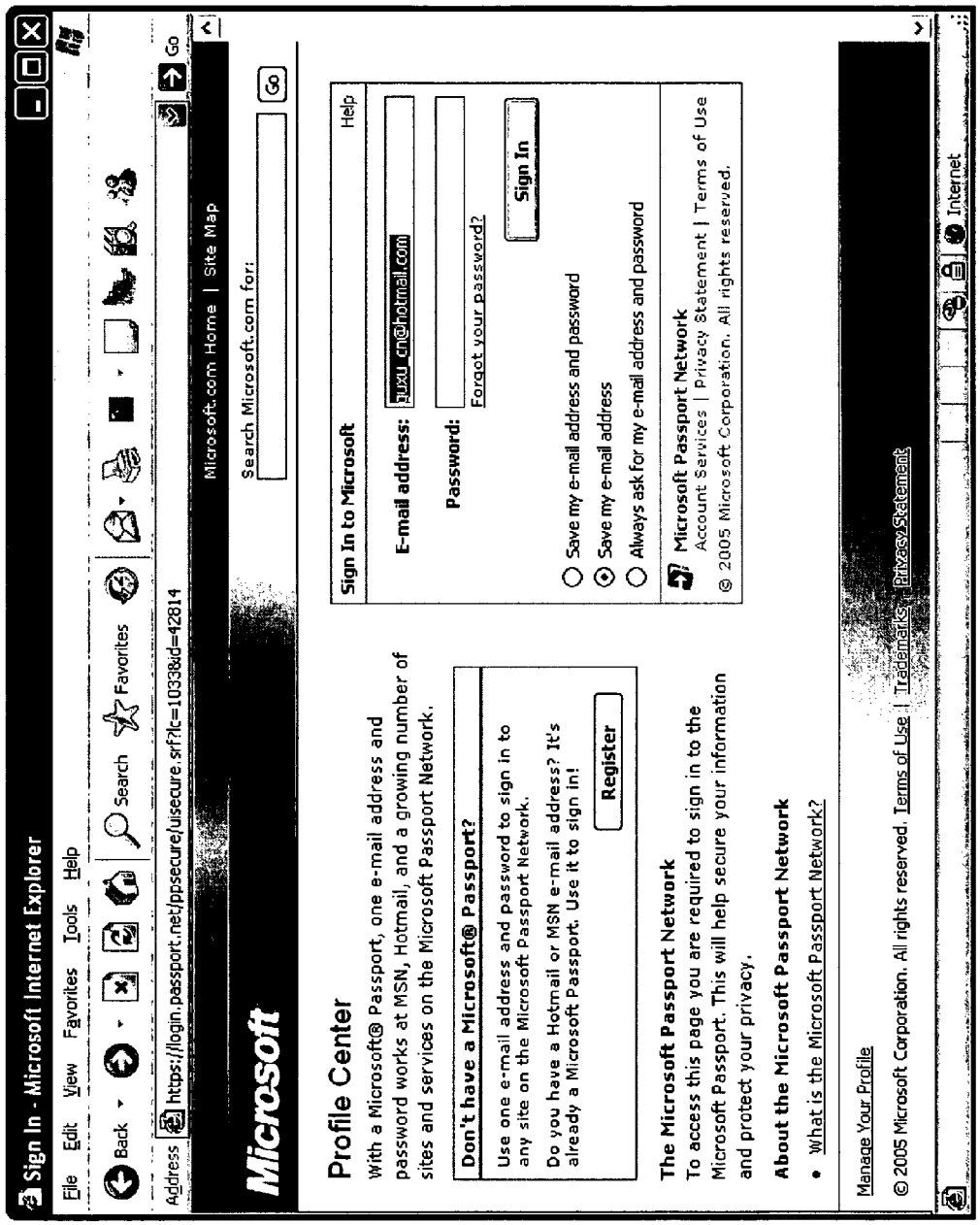
Figure 1C:
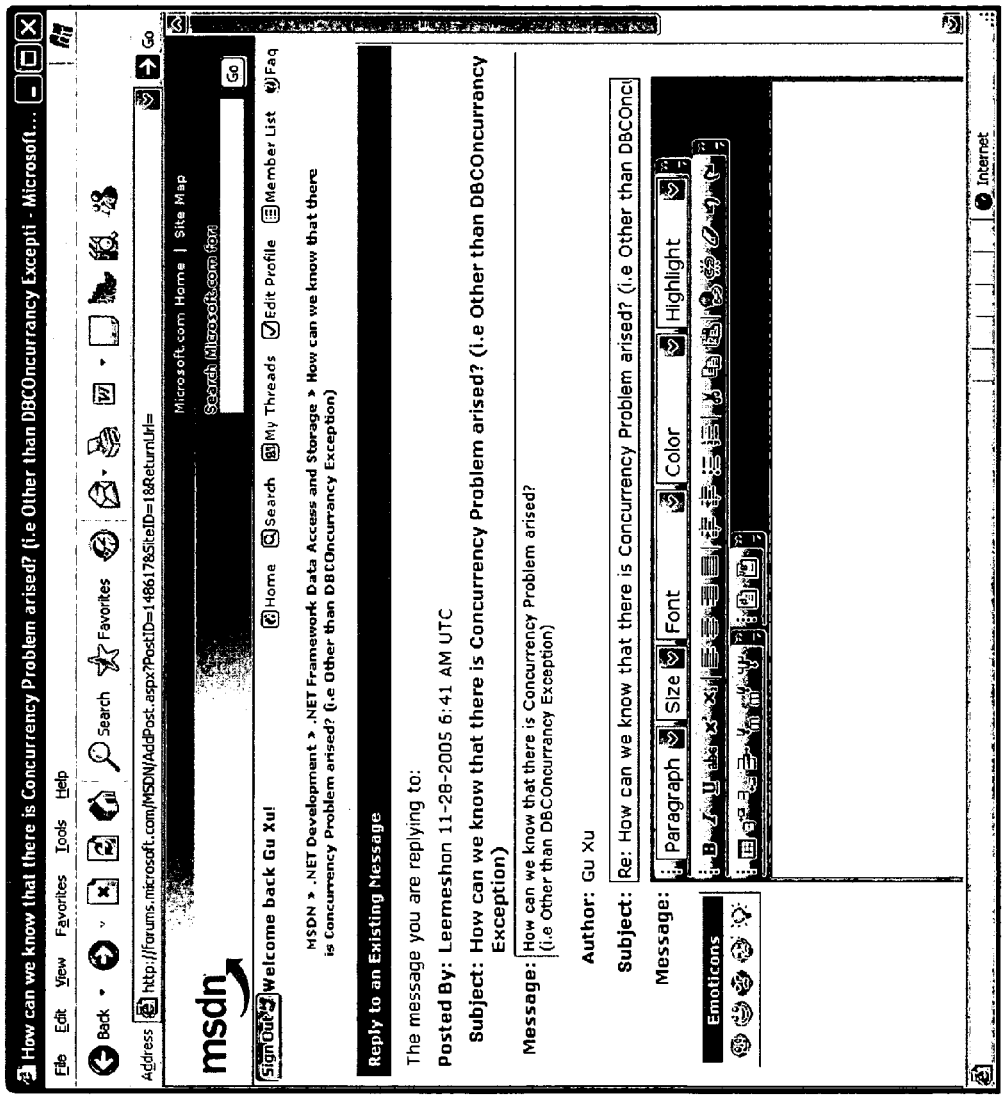

FIGS. 1A-1C illustrate the types of pages of a web forum. FIG. 1A illustrates a posting page that contains the content of a posting 111. The posting page is an informational page. The posting page also includes links or references 112-115 to operational pages. FIG. 1B illustrates a login page. The login page is an operational page that contains no informational content of interest. FIG. 1C illustrates a reply page. The reply page is also an operational page that contains no informational content of interest that is not on an informational page.

Figure 2:
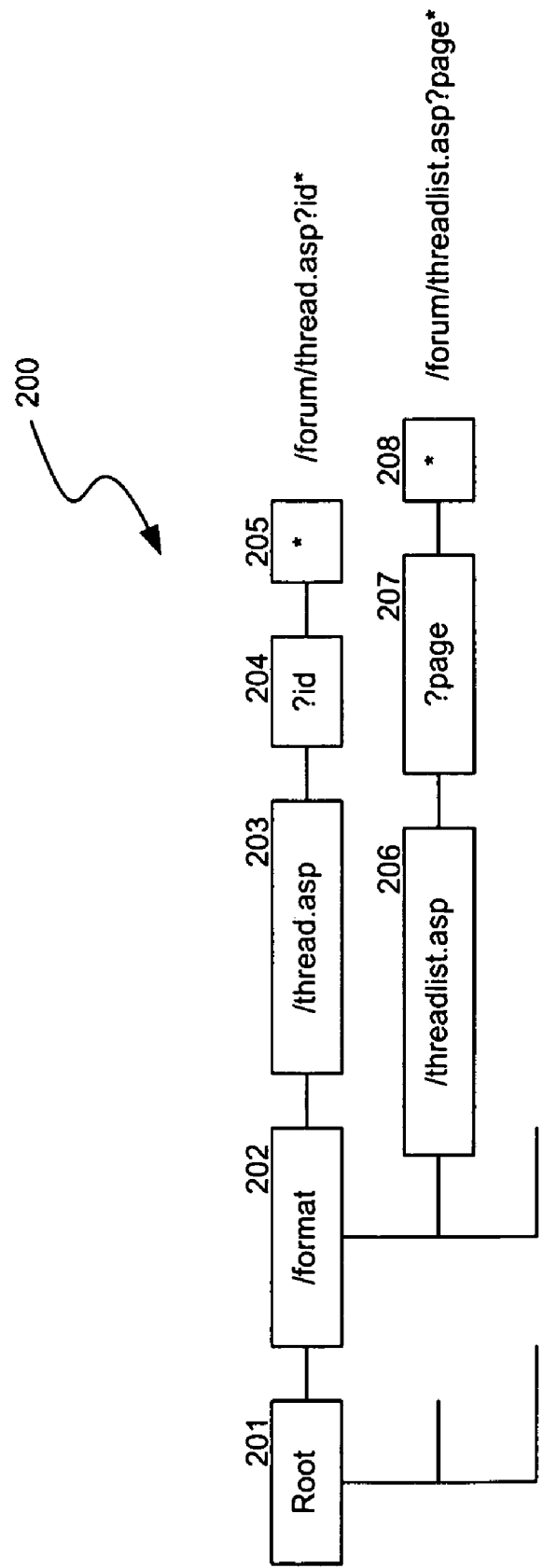
FIG. 2 illustrates a reference pattern data structure.

FIG. 2 illustrates a reference pattern data structure. The data structure 200 includes a root node 201 and child nodes 202-208. The data structure is a prefix structure in that all reference patterns that share a common prefix share a common portion of the prefix tree. For example, the reference patterns that include sibling nodes 203 and 206 have a common prefix represented by node 202. The crawling system may also use various other data structures such as a hash table.

Figure 3:
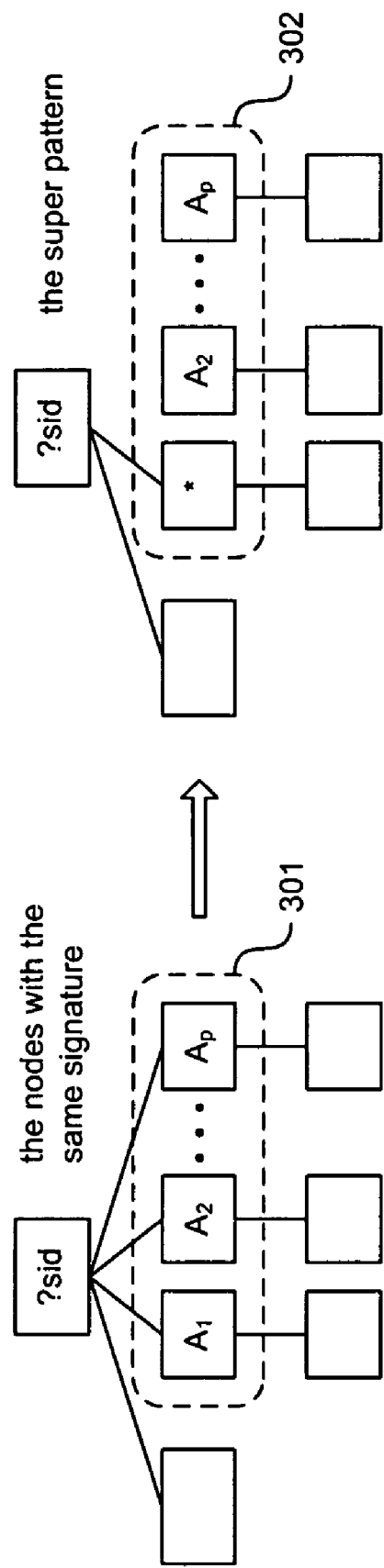
FIG. 3 is a diagram that illustrates the adding of wildcard nodes to the reference pattern data structure.

FIG. 3 is a diagram that illustrates the adding of wildcard nodes to the reference pattern data structure. In this example, the crawling system has determined using the suffix signature that the sibling nodes 301 have suffixes that are similar. In such a case, the crawling system replaces the sibling nodes 302 with a single sibling node that represents a wildcard character.

Figure 4:
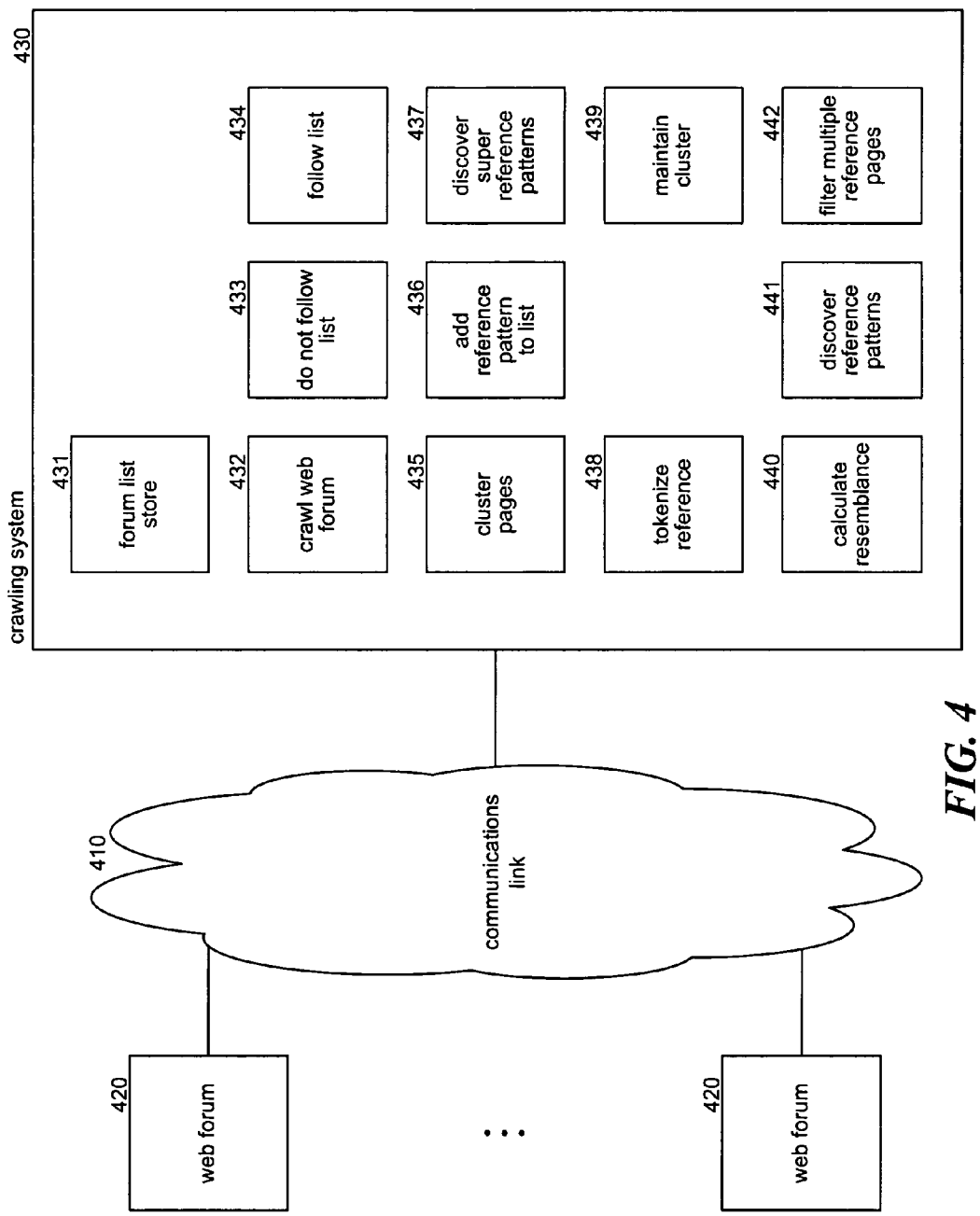
FIG. 4 is a block diagram that illustrates components of the crawling system in one embodiment.

FIG. 4 is a block diagram that illustrates components of the crawling system in one embodiment. The crawling system 430 is connected to web forums 420 via communications link 410. The crawling system may include a forum list store 431, a crawl web forum component 432, a do not follow list 433, a follow list 434, a cluster pages component 435, an add reference pattern to list component 436, a discover super reference patterns component 437, a tokenize reference component 438, a maintain cluster component 439, a calculate resemblance component 440, a discover reference patterns component 441, and a filter multiple reference pages component 442. The forum list store contains a list of web forums that are to be crawled by the crawling system. The crawl web forum component implements the pattern detection phase of the crawling system. The component stores its results in the do not follow list and in the follow list. The cluster pages component identifies clusters of similar pages of a web forum. The add reference pattern to list component adds reference patterns to the do not follow list and the follow list as appropriate. The discover super reference patterns component replaces sibling nodes within the pattern data structure with a wildcard character when the suffixes of the reference patterns are similar. The tokenize reference component tokenizes the references. The maintain cluster component maintains the clusters by ensuring that the number of clusters does not get too large and that any one cluster does not contain too many pages. The calculate resemblance component calculates the resemblance between two pages. The discover reference patterns component discovers reference patterns for the references of a cluster. The filter multiple reference pages component identifies reference patterns that point to the similar pages.

The computing devices on which the crawling system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the crawling system. In addition, the data structures and message structures may be stored or transmitted via a data transmission medium, such as a signal on a communications link. Various communications links may be used, such as the Internet, a local area network, a wide area network, or a point-to-point dial-up connection.

The crawling system may be implemented on various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The crawling system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
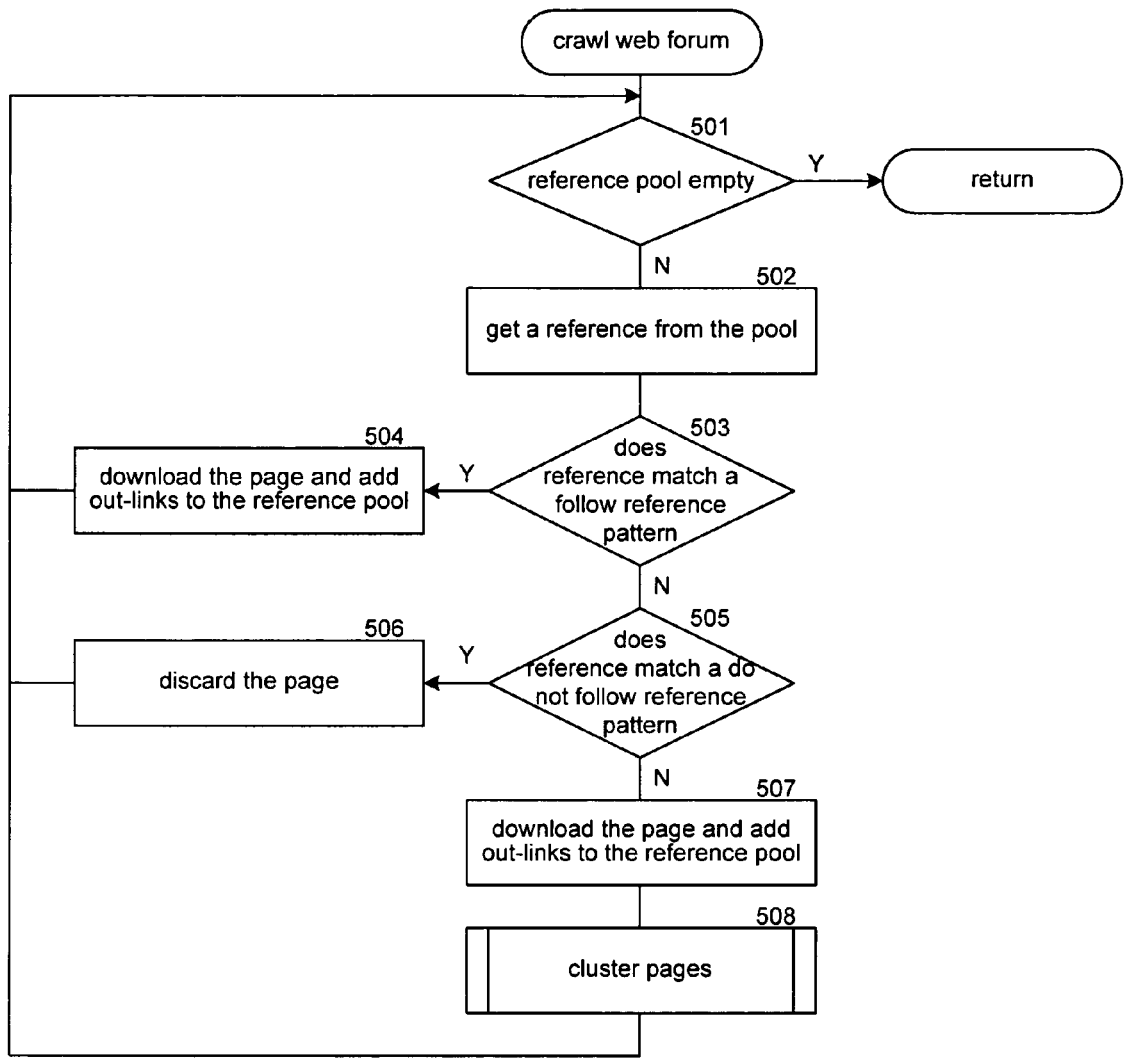
FIG. 5 is a flow diagram that illustrates the processing of the crawl web forum component of the crawling system in one embodiment.

FIG. 5 is a flow diagram that illustrates the processing of the crawl web forum component of the crawling system in one embodiment. The component crawls the web forum and adds reference patterns to the follow and do not follow lists as appropriate. The component initializes a reference pool with references with seed web pages of web forum. In decision block 501, if the reference pool is empty, then the component completes, else the component continues at block 502. In block 502, the component retrieves a reference from the reference pool. In decision block 503, if the retrieved reference matches a reference pattern in the follow list, then the component continues at block 504, else the component continues at block 505. In block 504, the component downloads the web page referenced by the retrieved reference, adds its outgoing links to the reference pool, and then loops to block 501 to retrieve the next reference. In decision block 505, if the retrieved reference matches a reference pattern in the do not follow list, the component continues at block 506, else the component continues at block 507. In block 506, the component discards the retrieved reference and loops to block 501 to retrieve the next reference. In block 507, the component downloads the web page referenced by the retrieved reference and adds its outgoing links to the reference pool. In block 508, the component invokes the cluster pages component to identify clusters of pages and then loops to block 501 to retrieve the next reference.

Figure 6:
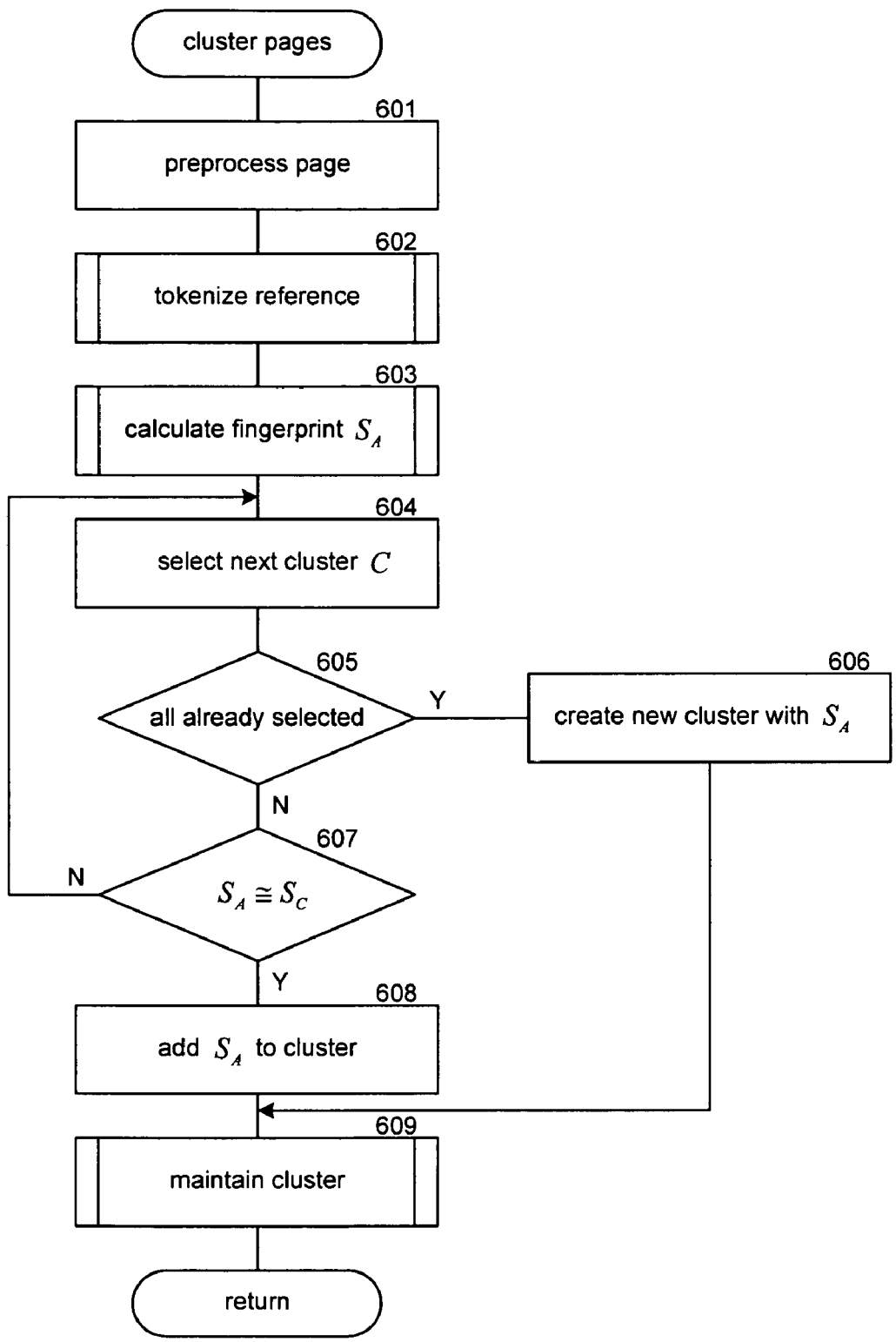
FIG. 6 is a flow diagram that illustrates the processing of the cluster pages component of the crawling system in one embodiment.

FIG. 6 is a flow diagram that illustrates the processing of the cluster pages component of the crawling system in one embodiment. The component is passed a page and determines the cluster to which the page belongs and performs maintenance on the clusters. In block 601, the component preprocesses the page to extract the text of the page. In block 602, the component invokes the tokenize reference component to tokenize the reference used to locate the page. In block 603, the component invokes the calculate fingerprint component to calculate the fingerprint for the page and returns the fingerprint as a set of shingles or a sketch of shingles. In blocks 604-607, the component loops searching for a cluster that contains pages that are similar to the passed page. In block 604, the component selects the next cluster. In decision block 605, if all the clusters have already been selected, then the component continues in block 606, else the component continues in block 607. In block 606, the component creates a new cluster for the page because the page is not similar to the pages of any cluster and continues at block 609. In decision block 607, if the page is similar to the pages of the selected cluster, then the component continues at block 608, else the component loops to block 604 to select the next cluster. In block 608, the component adds the page to the cluster. In block 609, the component invokes the maintain cluster component and then returns.

Figure 7:
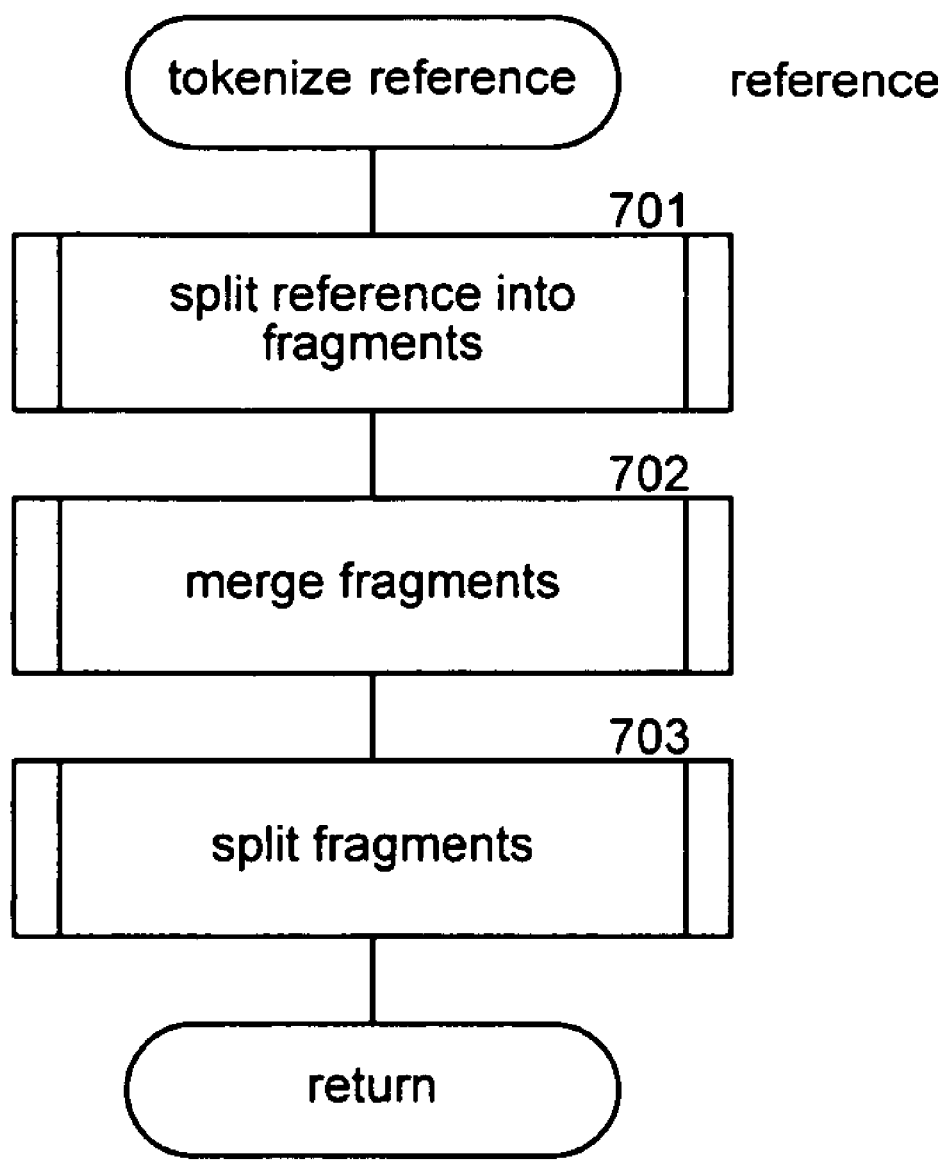
FIG. 7 is a flow diagram that illustrates the processing of the tokenize reference component of the crawling system in one embodiment.

FIG. 7 is a flow diagram that illustrates the processing of the tokenize reference component of the crawling system in one embodiment. The component is passed a reference and returns tokens for that reference. In block 701, the component invokes a component to split the reference into fragments. In block 702, the component invokes a component to merge the fragments. In block 703, the component invokes a component to split the merged fragments. The component then returns the split fragments as the tokens of the reference.

Figure 8:
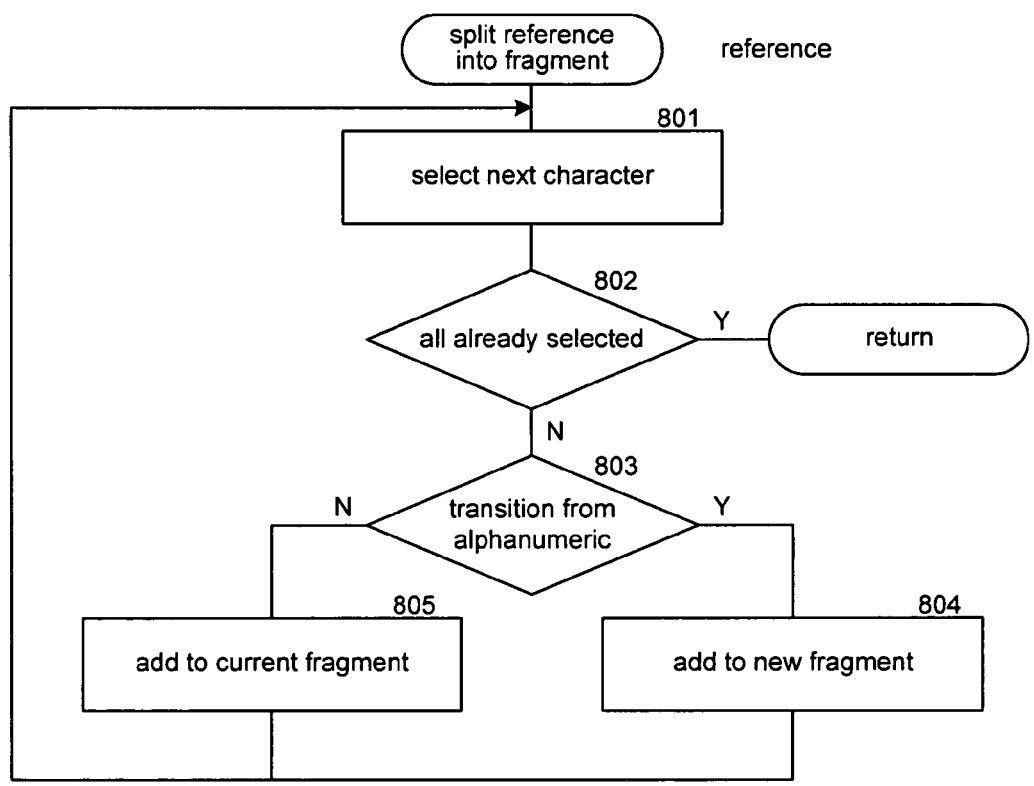
FIG. 8 is a flow diagram that illustrates the processing of the split reference into fragments component of the crawling system in one embodiment.

FIG. 8 is a flow diagram that illustrates the processing of the split reference into fragments component of the crawling system in one embodiment. The component is passed a reference and splits the reference into fragments based on non-alphanumeric characters. In block 801, the component selects the next character of the reference. In decision block 802, if all the characters of the reference have already been selected, then the component returns, else the component continues at block 803. In decision block 803, if the selected character is the first character of the reference or a transition from an alphanumeric character, then the component continues at block 804, else the component continues at block 805. In block 804, the component adds the selected character to a new fragment and then loops to block 801 to select the next character. In block 805, the component adds the selected character to the current fragment and then loops to block 801 to select the next character.

Figure 9:
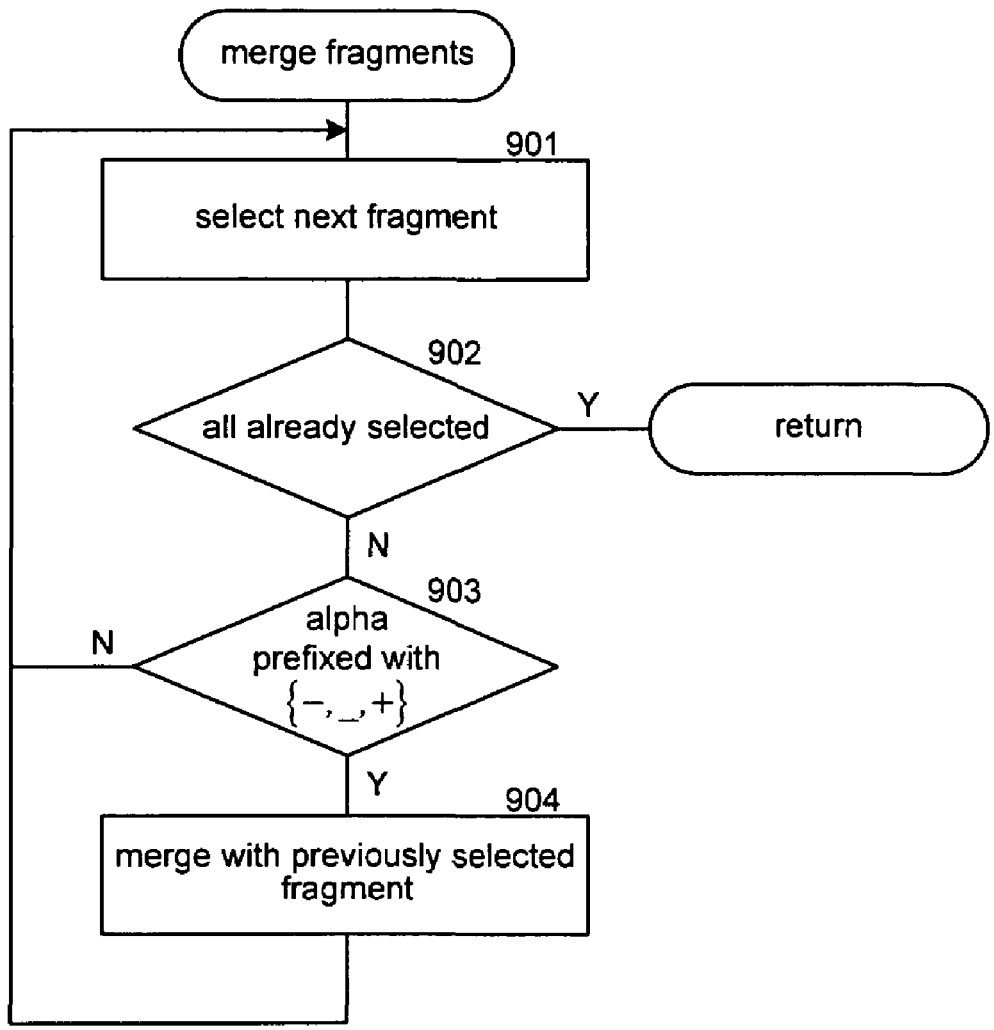
FIG. 9 is a flow diagram that illustrates the processing of the merge fragments component of the crawling system in one embodiment.

FIG. 9 is a flow diagram that illustrates the processing of the merge fragments component of the crawling system in one embodiment. The component is passed the initial fragments of a reference and merges an alphanumeric fragment with a hyphen, underscore, or plus prefix with a previous alphanumeric fragment. In block 901, the component selects the next fragment. In decision block 902, if all the fragments have already been selected, then the component returns the merged fragments, else the component continues at block 903. In decision block 903, if the selected fragment is an alphanumeric fragment with a hyphen, underscore, or plus prefix and the previous fragment is an alphanumeric fragment, then the component continues at block 904, else the component loops to block 901 to select the next fragment. In block 904, the component merges the selected fragment with the previously selected fragment to form a merged fragment and then loops to block 901 to select the next fragment.

Figure 10:
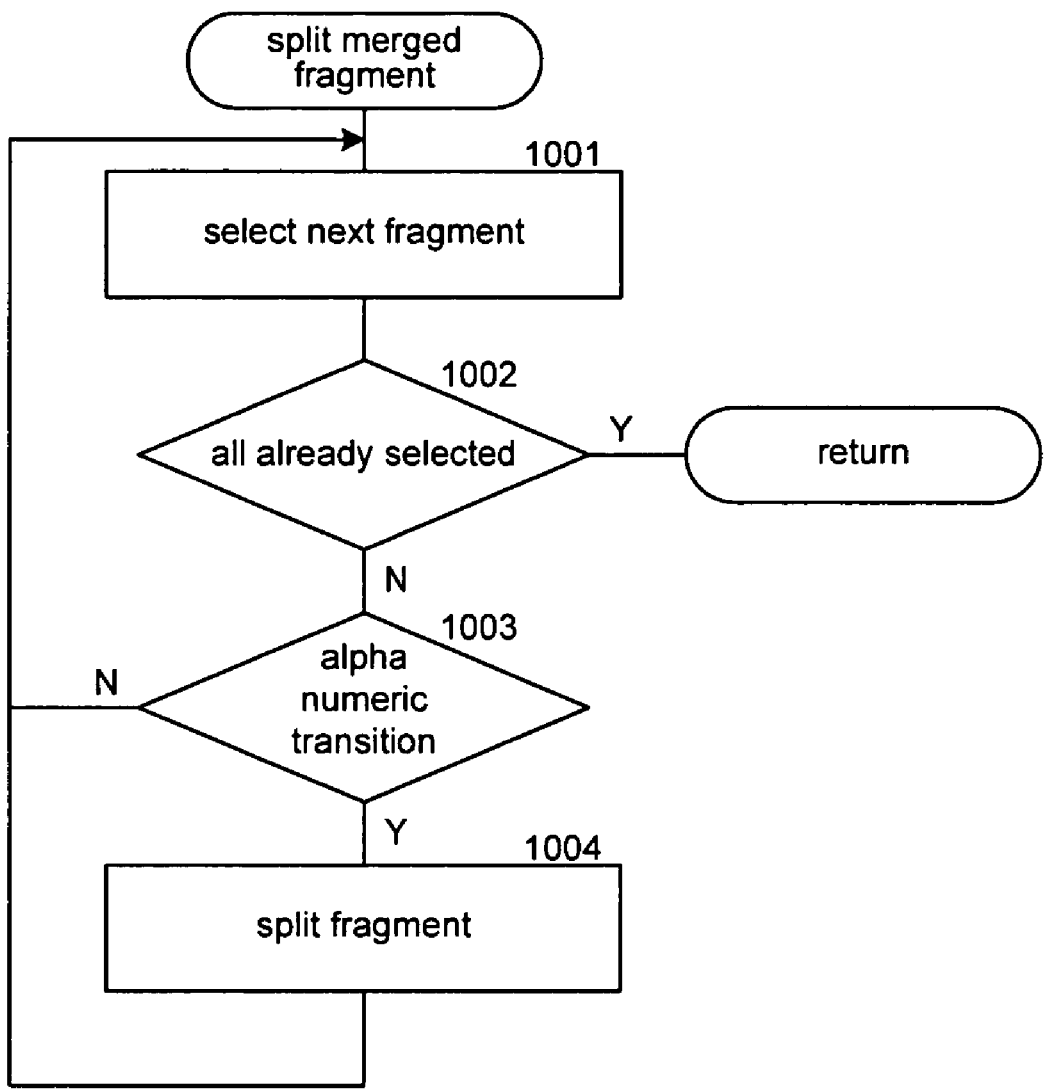
FIG. 10 is a flow diagram that illustrates the processing of the split merged fragments component of the crawling system in one embodiment.

FIG. 10 is a flow diagram that illustrates the processing of the split merged fragments component of the crawling system in one embodiment. The component is passed merged fragments and splits the merged fragments at alphanumeric transitions where a numeric character is followed by an alphabetic character or vice versa. In block 1001, the component selects the next fragment. In decision block 1002, if all the fragments have already been selected, then the component returns the split fragments, else the component continues at block 1003. In decision block 1003, if the selected fragment contains an alphanumeric transition, then the component continues at block 1004, else the component loops to block 1001 to select the next fragment. In block 1004, the component splits the fragment at the alphanumeric transition and loops to block 1001 to select the next fragment.

Figure 11:
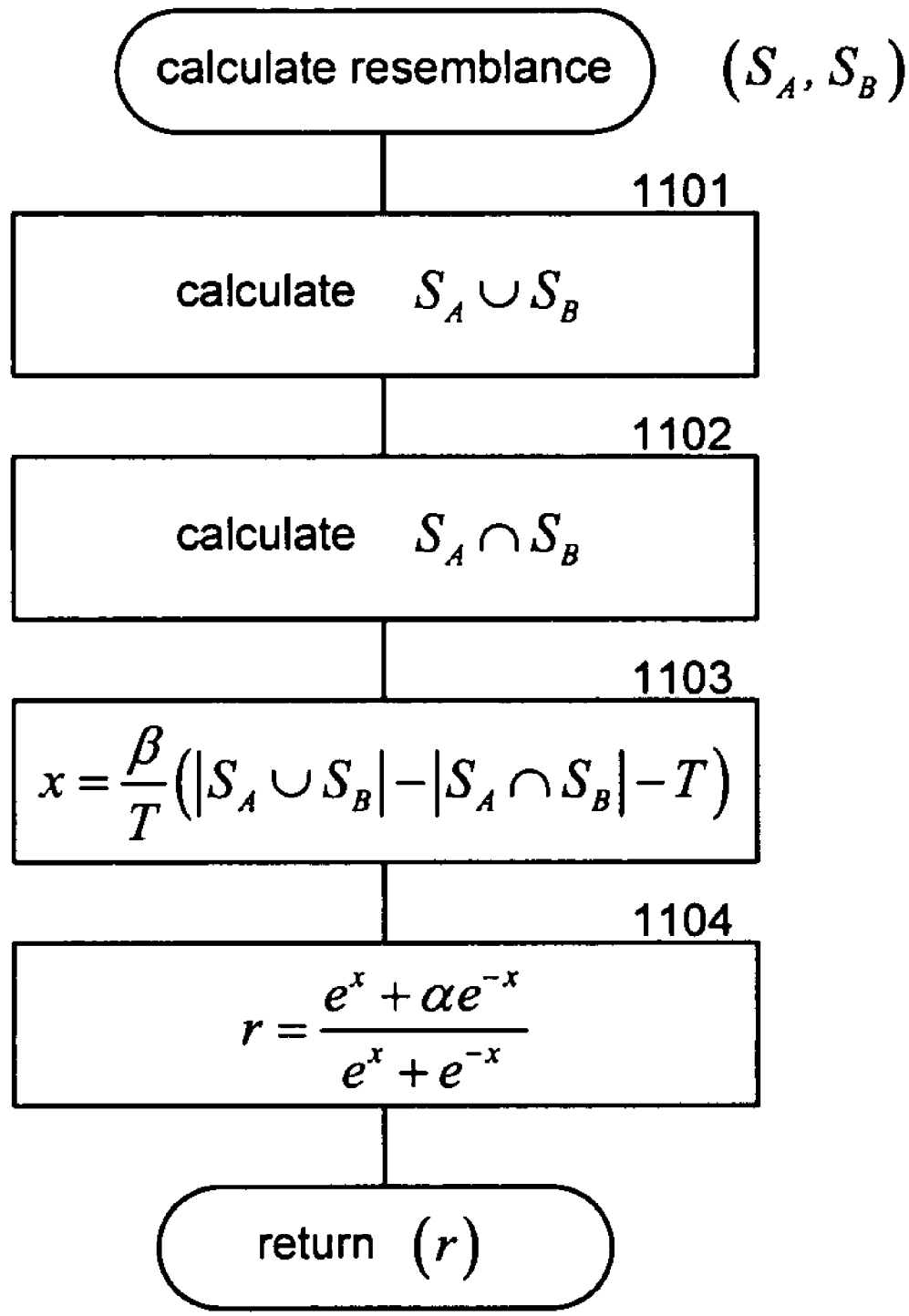
FIG. 11 is a flow diagram that illustrates the processing of the calculate resemblance component of the crawling system in one embodiment.

FIG. 11 is a flow diagram that illustrates the processing of the calculate resemblance component of the crawling system in one embodiment. The component is passed shingles representing two pages and calculates their resemblance. In block 1101, the component identifies the shingles that are in either page, that is, the union of the shingles. In block 1102, the component identifies the shingles that are common to both pages, that is, the intersection of the shingles. In block 1103, the component calculates the exponent for the resemblance calculation. In block 1104, the component calculates the resemblance using Equation 2 and then returns the resemblance.

Figure 12:
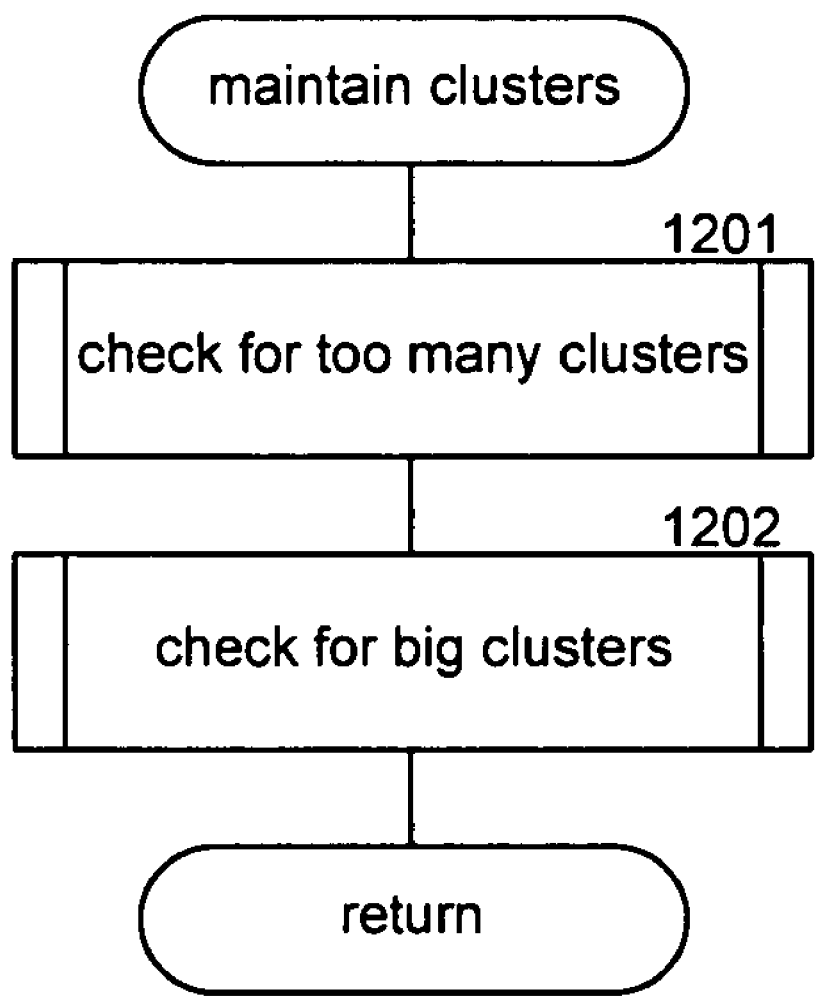
FIG. 12 is a flow diagram that illustrates the processing of the maintain clusters component of the crawling system in one embodiment.

FIG. 12 is a flow diagram that illustrates the processing of the maintain clusters component of the crawling system in one embodiment. The component is invoked to determine whether there are currently too many clusters for the web forum or whether a cluster of the web forum contains too many pages. In block 1201, the component invokes a check for too many clusters component. In block 1202, the component invokes a check for big clusters component. The component then returns.

Figure 13:
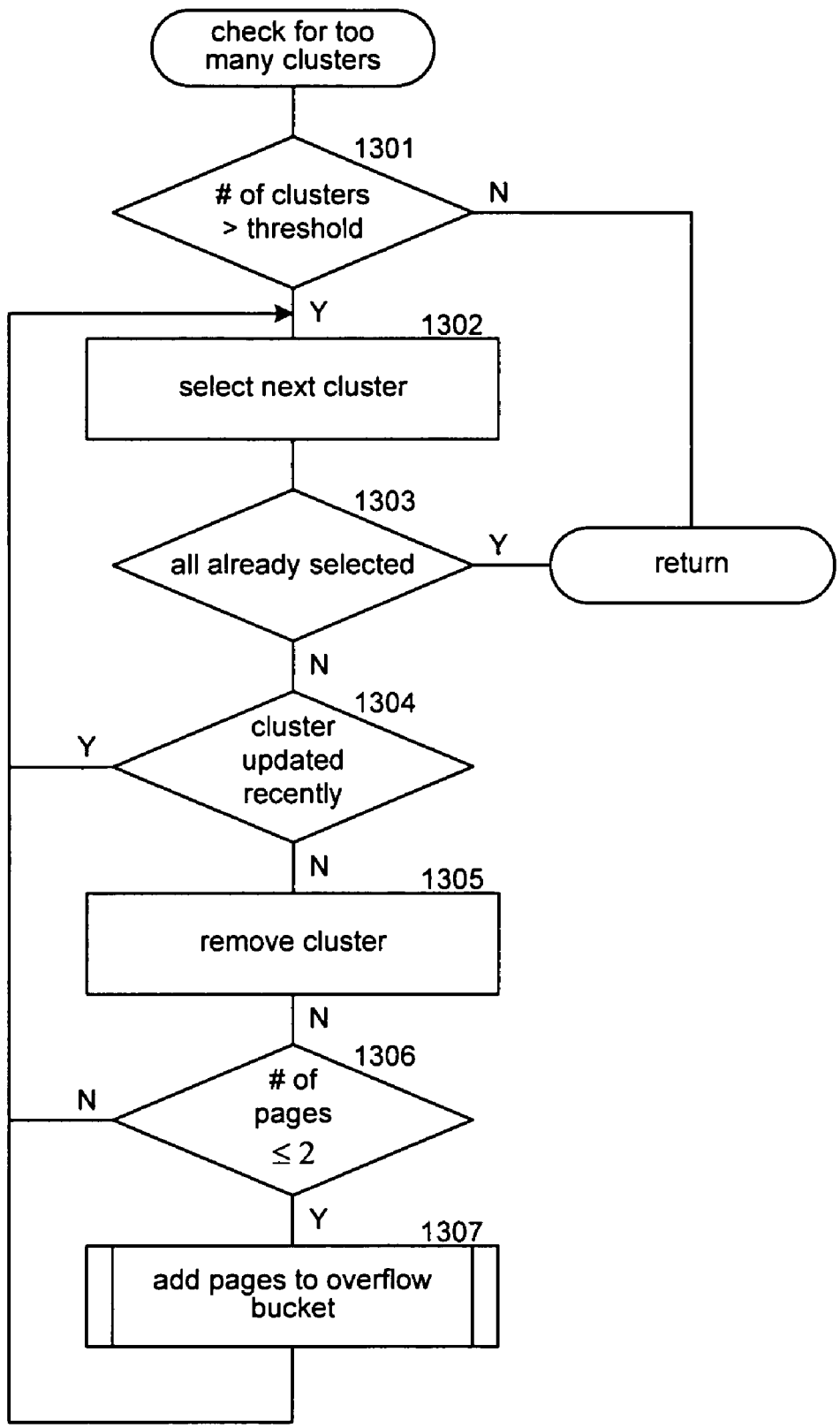
FIG. 13 is a flow diagram that illustrates the processing of the check for too many clusters component of the crawling system in one embodiment.

FIG. 13 is a flow diagram that illustrates the processing of the check for too many clusters component of the crawling system in one embodiment. In decision block 1301, if the number of clusters is greater than a threshold number, then the component continues at block 1302, else there are not too many clusters and the component returns. In blocks 1302-1307, the component loops removing clusters. In block 1302, the component selects the next cluster. In decision block 1303, if all the clusters have already been selected, then the maintenance is complete and the component returns, else the component continues at block 1304. In decision block 1304, if the selected cluster has been updated recently, then the crawling system may still be actively adding pages to the cluster and the component loops to block 1302 to select the next cluster, else the component continues at block 1305. In block 1305, the component removes the cluster. In decision block 1306, if the number of pages in the selected cluster is less than or equal to two, then the component continues at block 1307, else the component loops to block 1302 to select the next cluster. In block 1307, the component invokes the add pages to overflow bucket to add the pages of the cluster to an overflow bucket that contains informational pages and then loops to block 1302 to select the next cluster.

Figure 13A:
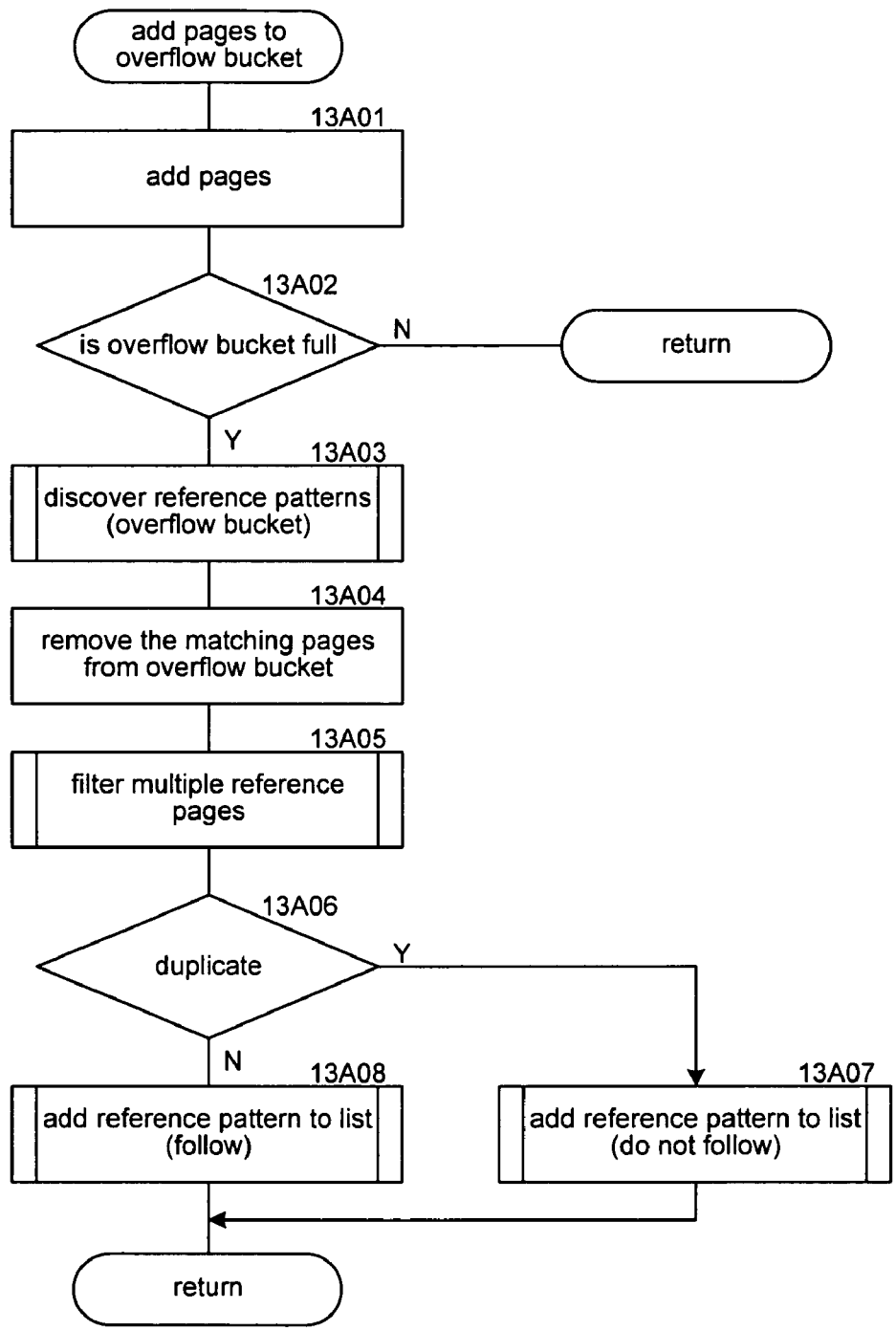
FIG. 13A is a flow diagram that illustrates the processing of the add pages to overflow bucket component of the crawling system in one embodiment.

FIG. 13A is a flow diagram that illustrates the processing of the add pages to overflow bucket component of the crawling system in one embodiment. The component adds the passed pages to the overflow bucket and discovers reference patterns if the overflow bucket is full. In block 13A01, the component adds the passed pages to the overflow bucket. In decision block, 13A02, if the overflow bucket is full, then the component returns, else the component continues at block 13A03. In block 13A03, the component invokes the discover reference patterns component passing the overflow bucket to discover reference patterns in the overflow bucket. In block 13A04, the component removes from the overflow bucket the pages that match the discovered reference patterns. The component performs the processing of blocks 13A05-13A08 for each discovered reference pattern. In block 13A05, the component invokes the filter multiple reference pages component to remove a discovered reference pattern that is a duplicate of a reference pattern already in the follow list. In decision block 13A06, if the discovered reference pattern is a duplicate, then the component continues at block 13A07, else the component continues at block 13A08. In block 13A07, the component invokes the add reference pattern to list component to add the discovered reference pattern to the do not follow list. In block 13A08, the component invokes the add reference pattern to list component to add the discovered reference pattern to the follow list. The component then returns.

Figure 14:
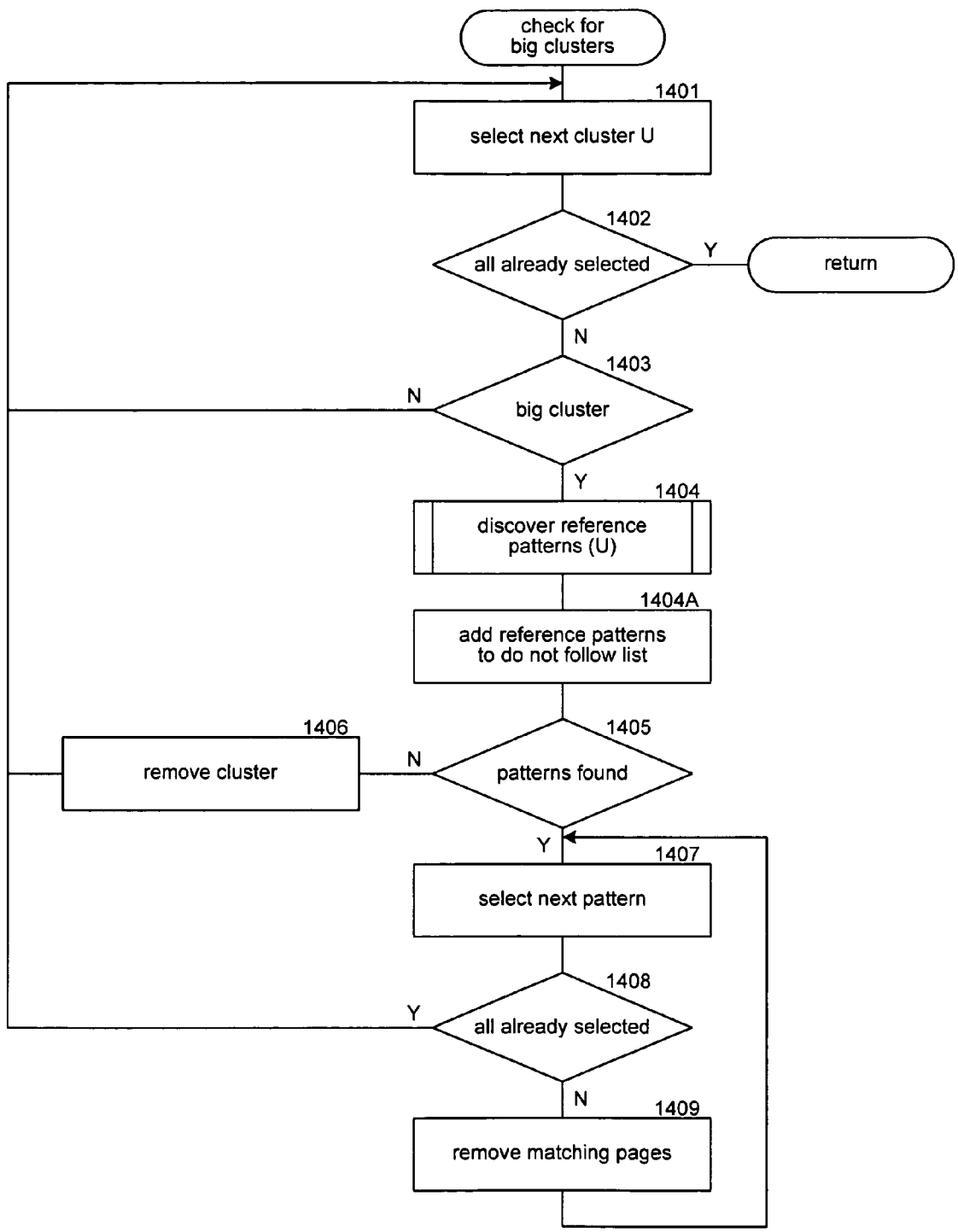
FIG. 14 is a flow diagram that illustrates the processing of the check for big clusters component of the crawling system in one embodiment.

FIG. 14 is a flow diagram that illustrates the processing of the check for big clusters component of the crawling system in one embodiment. The component checks for clusters that contain too many pages, attempts to identify reference patterns for the pages of such clusters, and removes those pages whose references match the reference patterns. In block 1401, the component selects the next cluster. In decision block 1402, if all the clusters have already been selected, then the component returns, else the component continues at block 1403. In decision block 1403, if the selected cluster is a big cluster, then the component continues at block 1404, else the component loops to block 1401 to select the next cluster. In block 1404, the component invokes the discover reference patterns component for the selected cluster. In block 1404A, the component loops invoking the add reference pattern to list component to add the discovered reference patterns to the do not follow list. In decision block 1405, if any reference patterns were found, then the component continues at block 1407, else the component continues at block 1406. In block 1406, the component removes the cluster and then loops to block 1401 to select the next cluster. In blocks 1407-1409, the component loops removing pages from the cluster whose reference matches a reference pattern. In block 1407, the component selects the next reference pattern. In decision block 1408, if all the reference patterns have already been selected, then the component loops to block 1401 to select the next cluster, else the component continues at block 1409. In block 1409, the component removes the pages corresponding to the matching references and then loops to block 1407 to select the next reference pattern.

Figure 15:
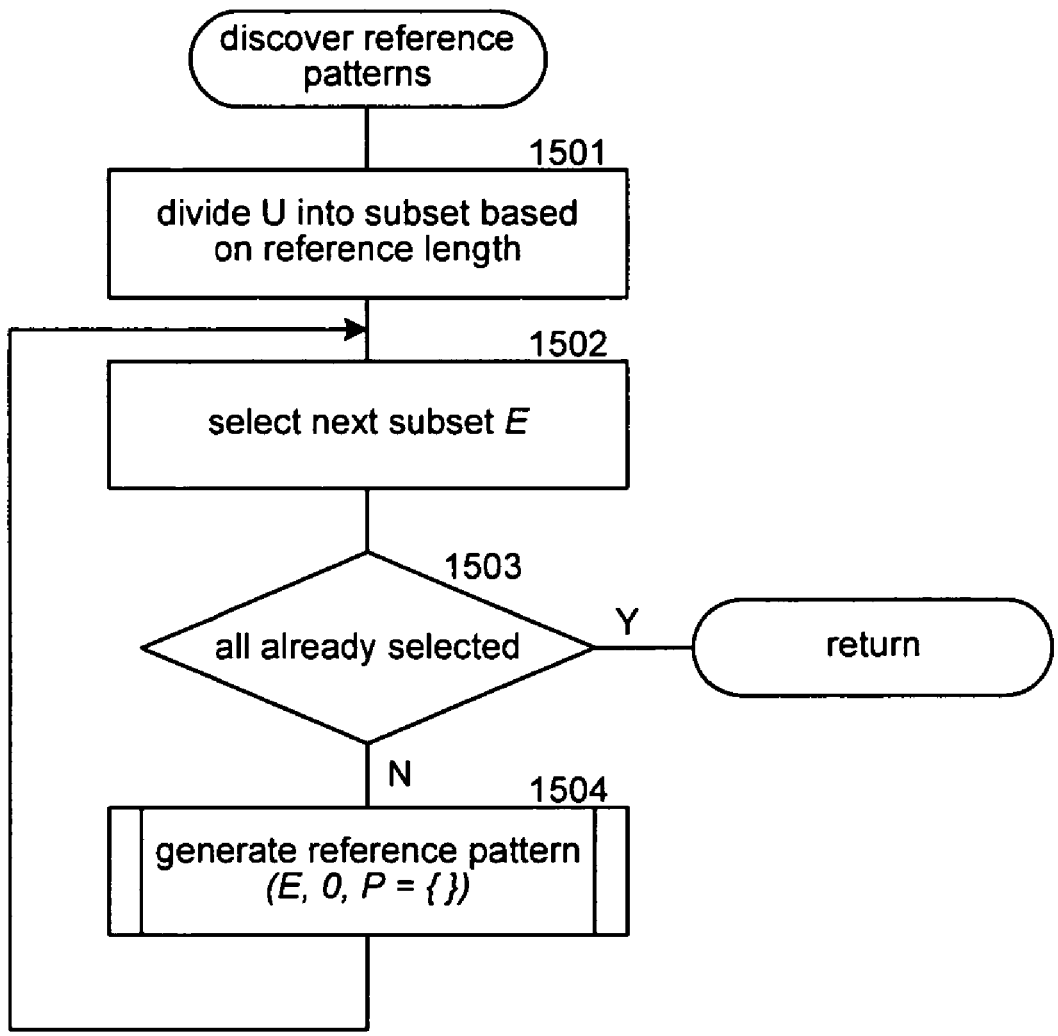
FIG. 15 is a flow diagram that illustrates the processing of the discover reference patterns component of the crawling system in one embodiment.

FIG. 15 is a flow diagram that illustrates the processing of the discover reference patterns component of the crawling system in one embodiment. The component is passed a set of references and discovers reference patterns for the references. In block 1501, the component divides the set of references into subsets based on the number of tokens in the references (i.e., token length). In blocks 1502-1504, the component loops selecting subsets and generating reference patterns for the selected subsets. In block 1502, the component selects the next subset. In decision block 1503, if all the subsets have already been selected, then the component returns, else the component continues at block 1504. In block 1504, the component invokes a generate reference pattern component passing the subset, an indication to start the generation at the first token of the references, and an empty pattern.

Figure 16:
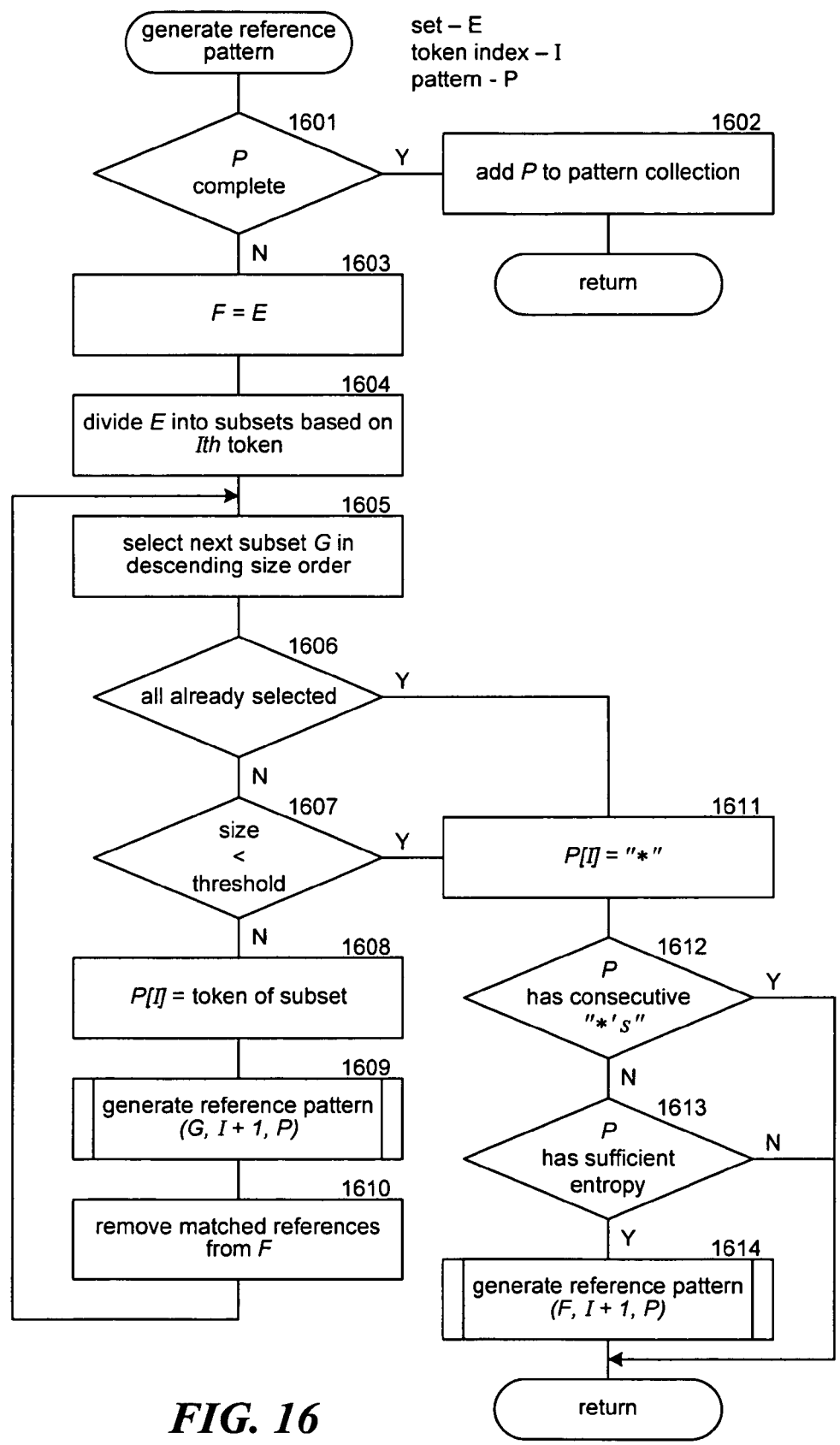
FIG. 16 is a flow diagram that illustrates the processing of the generate reference pattern component of the crawling system in one embodiment.

FIG. 16 is a flow diagram that illustrates the processing of the generate reference pattern component of the crawling system in one embodiment. The component is a recursive component that is passed a set of references, a token index within the set of references, and a generated pattern for the token at the lower indexes. The component divides the set of references based on the value of the passed token index. The component then recursively invokes the generate reference pattern component for the next token passing the pattern generated so far. When a subset of tokens with the same value has less than a certain number of tokens, the component adds a wildcard character to the pattern and recursively invokes the generate reference pattern component for the references of the subsets with less than the number of tokens. In decision block 1601, if the pattern is complete, then the component continues at block 1602, else the component continues at block 1603. In block 1602, the component adds the completed pattern to the collection of patterns and returns. In block 1603, the component initializes a set of references. In block 1604, the component divides the passed set of references into subsets based on the passed index of the token and sorts the subsets in descending order of size. In blocks 1605-1610, the component loops selecting the subsets in descending order of size. In block 1605, the component selects the next subset in descending order of size. In decision block 1606, if all the subsets have already been selected, then the component continues at block 1611, else the component continues at block 1607. In decision block 1607, if the size of the number of references within the selected subset is less than the threshold number, then the component continues at block 1611, else the component continues at block 1608. In block 1608, the component sets the next token of the pattern to the token of the selected subset. In block 1609, the component recursively invokes the generate reference pattern component passing the selected subset of references, the next index of the tokens, and the pattern generated so far. In block 1610, the component removes from the initial set of references those references that match the returned pattern. The component then loops to block 1605 to select the next subset. In block 1611, the component sets the next token of the pattern to the wildcard character. In decision block 1612, if the pattern has consecutive wildcard characters, then the component returns, else the component continues at block 1613. In decision block 1613, if the pattern has sufficient entropy, then the component continues at block 1614, else the component returns. In block 1614, the component recursively invokes the generate reference pattern component passing the current set of tokens, the next index of the tokens, and the pattern generated so far. The component then returns.

Figure 17:
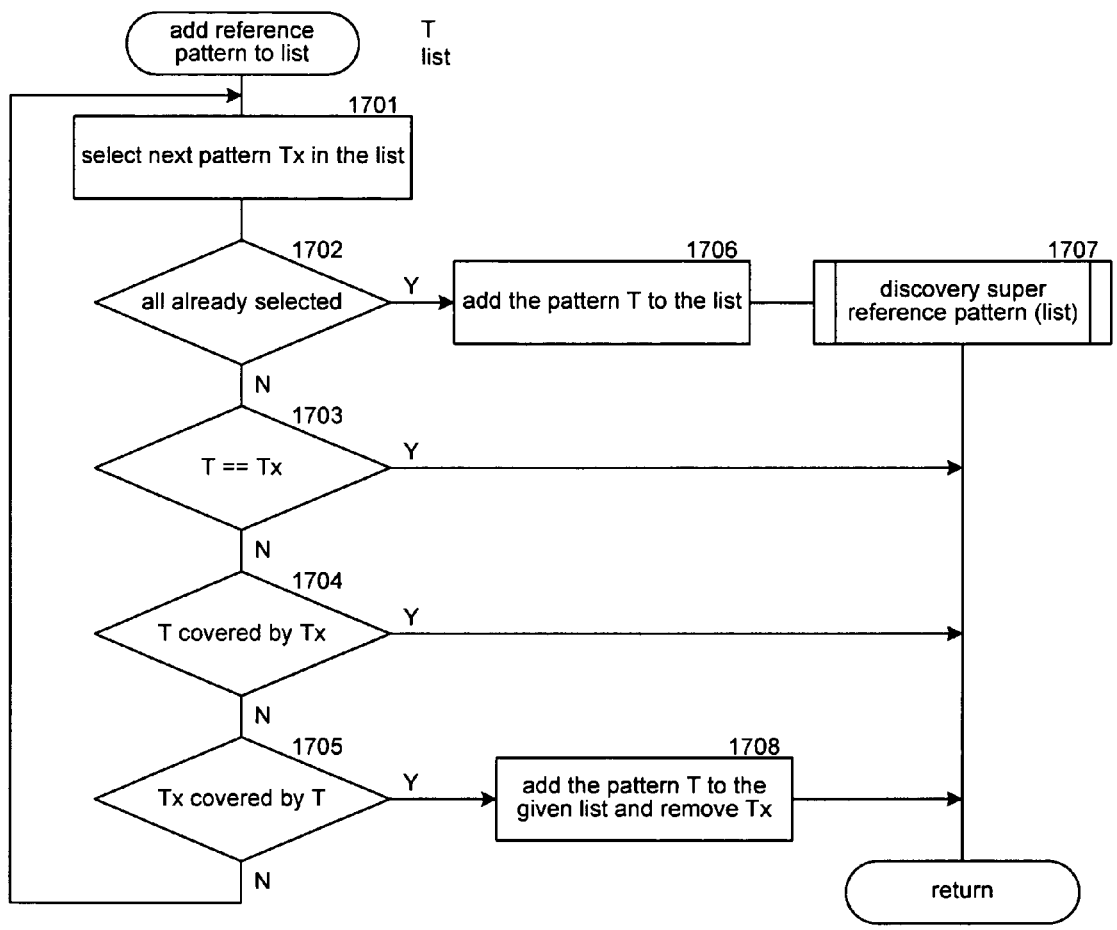
FIG. 17 is a flow diagram that illustrates the processing of the add reference patterns to lists component of the crawling system in one embodiment.

FIG. 17 is a flow diagram that illustrates the processing of the add reference pattern to lists component of the crawling system in one embodiment. The component is passed a reference pattern T and an indication of the follow list or the do not follow list and adds the reference pattern to that list assuming that the reference pattern is not already covered by a reference pattern in the list. A reference pattern is covered by another reference pattern when all the pages that match the reference pattern also match the other reference pattern. In other words, the covered reference pattern identifies a subset of the pages identified by the covering reference pattern. The component loops selecting each reference pattern in the passed list. In block 1701, the component selects the next reference pattern Tx in the list. In decision block 1702, if all the reference patterns Tx in the list have already been selected, then the component continues at block 1706, else the component continues at block 1703. In decision block 1703, if the passed reference pattern T and the selected reference pattern Tx are the same, then the component returns, else the component continues at block 1704. In decision block 1704, if the passed reference pattern T is covered by the selected reference pattern Tx, then the component returns, else the component continues at block 1705. In decision block 1705, if the selected reference pattern Tx is covered by the passed reference pattern T, then the component continues at block 1708, else the component loops to block 1701 to select the next reference pattern. In block 1706, the component adds the passed reference pattern T to the passed list. In block 1707, the component invokes the discover super reference pattern component passing the passed list and then returns. In block 1708, the component adds the passed reference pattern T to the passed list and removes the selected reference pattern Tx from the passed list and then returns.

Figure 18:
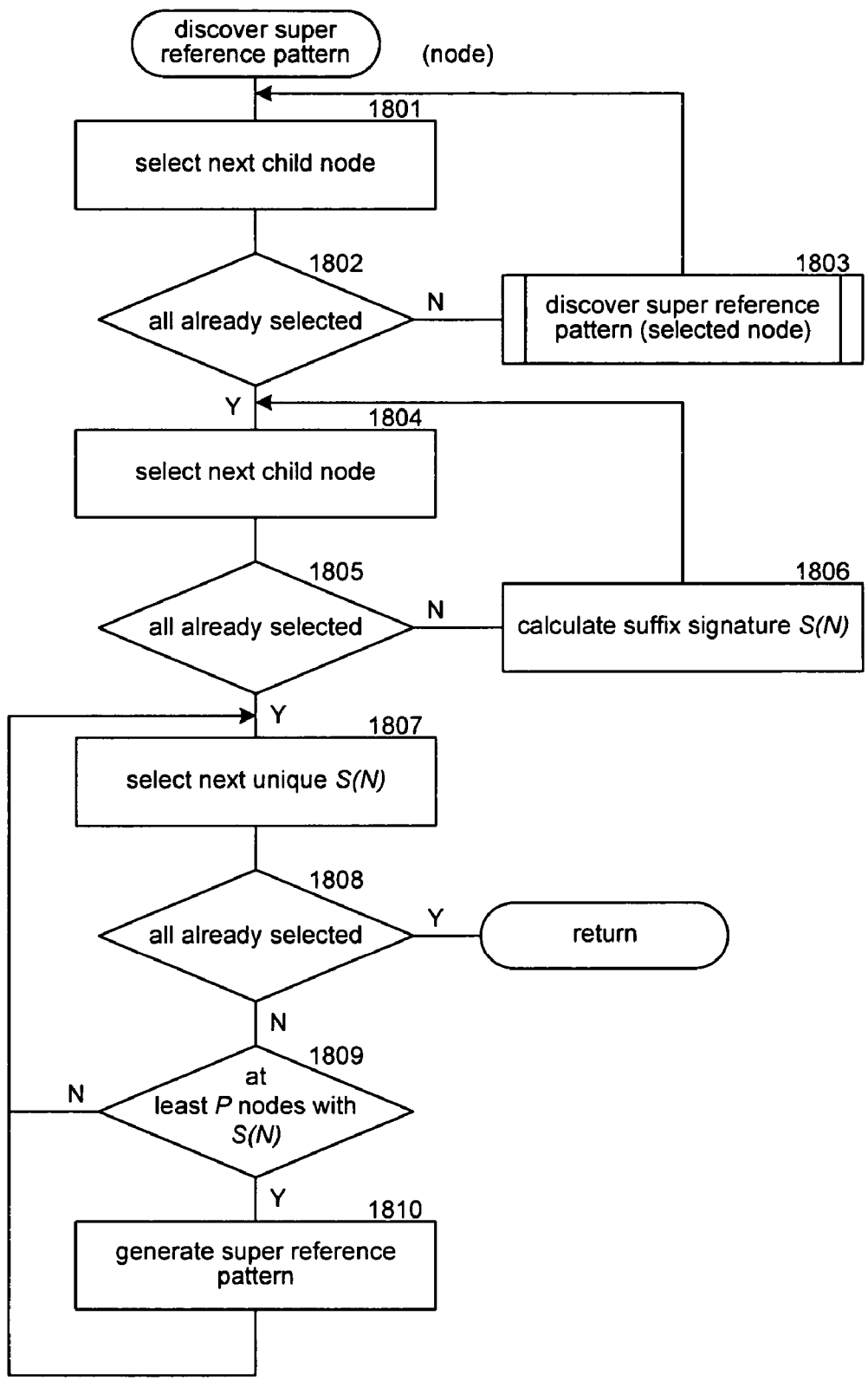
FIG. 18 is a flow diagram that illustrates the processing of the discover super reference pattern component of the crawling system in one embodiment.

FIG. 18 is a flow diagram that illustrates the processing of the discover super reference patterns component of the crawling system in one embodiment. The component is passed a node in a prefix tree for a passed reference pattern list and recursively invokes the component for each child node. The component then attempts to merge sibling nodes that have similar suffixes. In block 1801, the component selects the next child node. In decision block 1802, if all the child nodes have already been selected, then the component continues at block 1804, else the component continues at block 1803. In block 1803, the component recursively invokes the discover super reference patterns component passing the selected node. The component then loops to block 1801 to select the next child node. In blocks 1804-1806, the component loops calculating the suffix signature for each child node. In block 1804, the component selects the next child node. In decision block 1805, if all the child nodes have already been selected, then the component continues at block 1807, else the component continues at block 1806. In block 1806, the component calculates the suffix signature for the selected child node and loops to block 1804 to select the next child node. In blocks 1807-1810, the component generates a super reference pattern for child nodes that have the same suffix signature. In block 1807, the component selects the next unique suffix signature of the child nodes. In decision block 1808, if all the unique suffix signatures have already been selected, then the component returns, else the component continues at block 1809. In block 1809, if at least a threshold number of nodes have the selected suffix signature, then the component continues at block 1810, else the component loops to block 1807 to select the next unique suffix signature. In block 1810, the component generates the super reference pattern for the child nodes that have the selected suffix signature and loops to block 1807 to select the next unique suffix signature.

Figure 19:
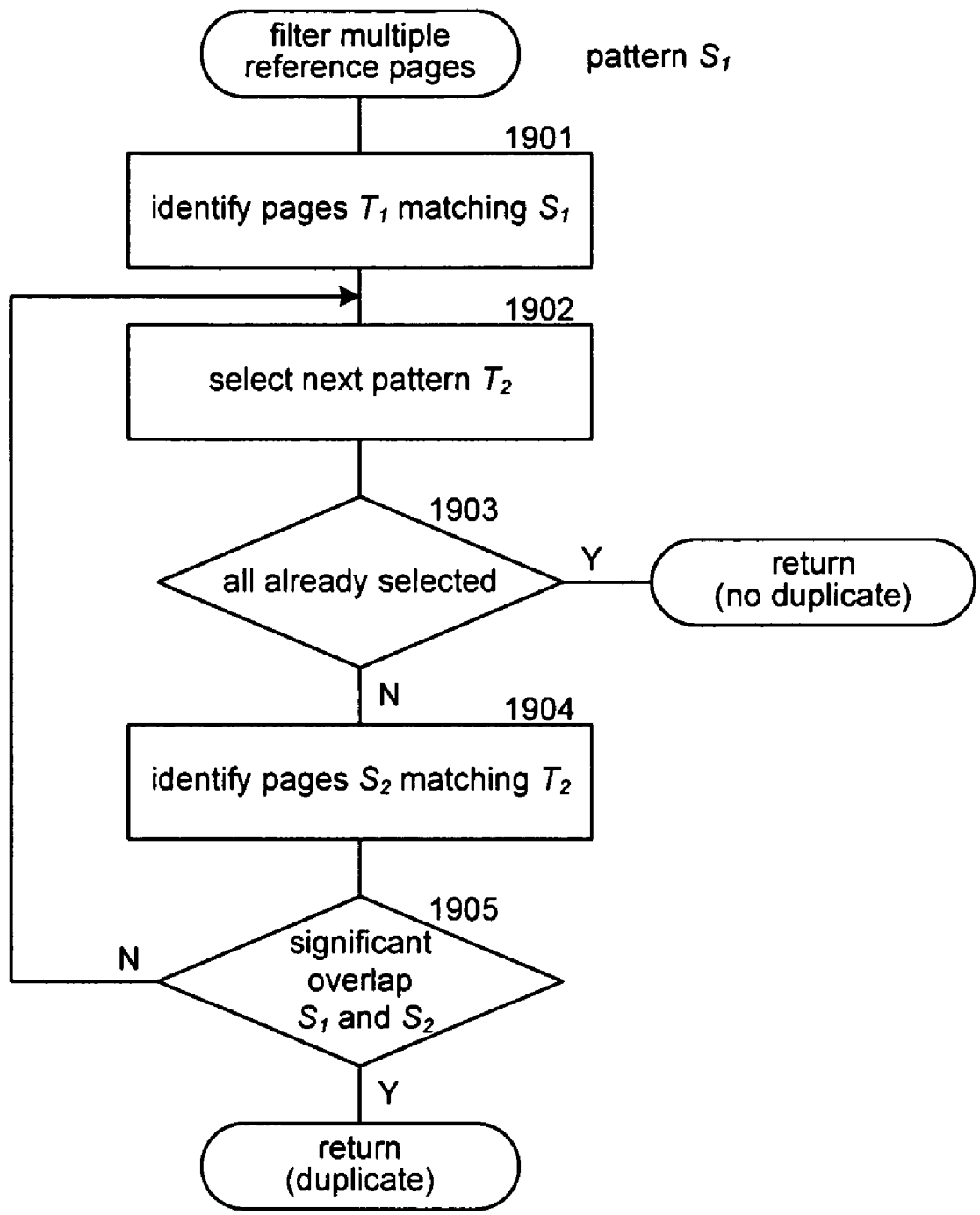
FIG. 19 is a flow diagram that illustrates the processing of the filter multiple references pages component of the crawling system component in one embodiment.

FIG. 19 is a flow diagram that illustrates the processing of the filter multiple reference pages component of the crawling system in one embodiment. The component is passed a pattern and determines whether the pattern represents duplicate pages of a pattern already in the follow list. In block 1901, the component identifies the pages that match the passed pattern. In block 1902, the component selects the next pattern in the list. In decision block 1903, if all the patterns have already been selected, then the component returns an indication that the pattern is not a duplicate pattern, else the component continues at block 1904. In block 1904, the component identifies pages that match the selected pattern. In block 1908, if there is significant overlap between the pages that match the passed pattern and the pages that match the selected pattern, then the component returns an indication that the passed pattern is a duplicate, else the component loops to block 1902 to select the next pattern.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A system with a processor and memory for crawling a site having pages, each page having a reference that identifies the page, each reference having tokens, comprising:
   a grouping component that identifies groups of pages with similar content;
   a pattern component that identifies a reference pattern of a group based on the references of the pages of the group, the reference pattern being identified by analyzing the tokens of the references of the pages of the group to identify sequences of tokens indicating a pattern of tokens within the references; and
   a decision component that, after encountering a reference that matches a reference pattern when crawling the site, decides whether to access the page of the encountered reference based on characteristics of the pages of the group of the matching reference pattern
   wherein the components are implemented as computer-executable instructions stored in the memory for execution by the processor.

2. The system of claim 1 wherein the characteristics include number of pages within the group.

3. The system of claim 2 wherein when a group has less than a certain number of pages, the decision component decides to access pages whose references match a reference pattern of the group.

4. The system of claim 2 wherein when a group has more than a certain number of pages, the decision component decides not to access pages whose references match a reference pattern of the group.

5. The system of claim 1 wherein the grouping component and the pattern component are used to perform an initial crawling of the site and the decision component is used to perform subsequent crawling of the site using the reference patterns.

6. The system of claim 1 wherein the grouping component determines that pages are similar based on the number of shingles that are common to the pages and the total number of unique shingles of the pages.

7. The system of claim 1 wherein the site is a web forum.

8. The system of claim 1 wherein the grouping component detects multiple reference pages.

9. A system with a processor and memory for detecting web pages of a web site having multiple uniform resource locators (URLs) that reference each web page, each URL having tokens, comprising:
   a grouping component that identifies groups of web pages with similar content;
   a pattern component that identifies a URL pattern of a group based on the URLs that reference the web pages of the group, the URL pattern being identified by analyzing the tokens of the URLs of the web pages of the group to identify sequences of tokens indicating a pattern of tokens within the URLs;
   a duplicate detection component that, when multiple URL patterns identify a similar set of web pages, indicates that the URL patterns reference multiple URL web pages wherein only one URL pattern of the multiple URL patterns that reference a multiple URL web page is selected for use when crawling the web site so that URLs that match the non-selected URL patterns are not followed based on the match; and
   a crawling component that crawls the web site such that, when encountering on a web page of the web site a URL that matches a URL pattern, decides whether to access the web page referenced by the encountered URL based on characteristics of the web pages of the group of the matching URL pattern
   wherein the components are implemented as computer-executable instructions stored in the memory for execution by the processor.

10. The system of claim 9 wherein the web site is a web forum and wherein a multiple reference web page is referenced by previous and next references.

11. The system of claim 9 wherein the duplicate detection component does not detect duplicates for reference patterns that identify operational web pages of the web site.

12. A system with a processor and memory for crawling a web site having web pages, each web page having a URL reference that identifies the web page, each URL reference having characters, comprising:
   a group of informational web pages of the web site, the informational web pages being pages that are to be visited when crawling the web site;

a pattern component that identifies a URL reference pattern of the group of informational web pages of the web site based on the references of the web pages of the group, the URL reference pattern of a group representing a pattern of characters of URL references of the web pages of the group, the URL reference pattern including a wildcard character; and a crawling component that crawls the web site by
- encountering URL references on web pages of the web site that reference other web pages of the web site;
- after encountering a URL reference, determining whether the encountered URL reference matches the identified URL reference pattern based in part on the wildcard character of the URL reference pattern;
- when the encountered URL reference matches the identified URL reference pattern, following the encountered URL reference to retrieve the web page identified by the encountered URL reference pattern; and
- when the encountered URL reference does not match the identified URL reference pattern, not following the encountered URL references so that only encountered URL references that match the URL reference pattern of informational web pages are followed wherein the components are implemented as computer-executable instructions stored in the memory for execution by the processor.

13. The system of claim 12 wherein the web site is a web forum.

14. The system of claim 12 including a grouping component that identifies multiple groups of informational web pages that have similar content, wherein the pattern component identifies a URL reference pattern for each group, and including a duplicate detection component that, when multiple URL reference patterns identify groups with similar web pages, selects one of the multiple URL reference patterns for use in crawling the web site so that URL references that match the non-selected URL reference patterns are not followed.

* * * * *